(12) United States Patent
Takahashi et al.

(10) Patent No.: US 9,400,126 B2
(45) Date of Patent: Jul. 26, 2016

(54) MAGNETIC HEATING/COOLING APPARATUS

(71) Applicant: NISSAN MOTOR CO., LTD., Yokohama-shi, Kanagawa (JP)

(72) Inventors: Hidekazu Takahashi, Yokohama (JP); Yutaka Tasaki, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 240 days.

(21) Appl. No.: 14/359,671

(22) PCT Filed: Nov. 13, 2012

(86) PCT No.: PCT/JP2012/079410
§ 371 (c)(1),
(2) Date: May 21, 2014

(87) PCT Pub. No.: WO2013/077225
PCT Pub. Date: May 30, 2013

(65) Prior Publication Data
US 2014/0305139 A1    Oct. 16, 2014

(30) Foreign Application Priority Data

Nov. 24, 2011    (JP) ................................ 2011-256444

(51) Int. Cl.
*F25B 21/00*    (2006.01)

(52) U.S. Cl.
CPC ........... *F25B 21/00* (2013.01); *F25B 2321/002* (2013.01); *F25B 2321/0022* (2013.01); *Y02B 30/66* (2013.01)

(58) Field of Classification Search
CPC ............. F25B 21/00; F25B 2221/0022; F25B 2221/002; Y02B 30/66

USPC ............................................. 62/3.1
See application file for complete search history.

(56) References Cited

U.S. PATENT DOCUMENTS

| 2,154,437 | A | * | 4/1939 | Colton | ................... | G04C 23/00 |
| | | | | | | 318/484 |
| 2,189,619 | A | * | 2/1940 | Slepian | ................... | H01J 13/14 |
| | | | | | | 313/150 |

(Continued)

FOREIGN PATENT DOCUMENTS

| JP | 60-117066 A | 6/1985 |
| JP | 2007-147136 A | 6/2007 |

(Continued)

*Primary Examiner* — Mohammad M Ali
(74) *Attorney, Agent, or Firm* — Foley & Lardner LLP

(57) ABSTRACT

[Problem to be solved] To reduce the fluctuation in the driving force.
[Means to solve Problem] A magnetic cooling/heating apparatus comprising: a heat transfer unit 1000A comprising a plurality of heat transfer devices 50-1, 50-2, . . . arranged in parallel at intervals, wherein the heat transfer device 50-1 comprises magnetic bodies 10A-10F with a magneto-caloric effect and heat-conductive parts 30A-30G that transfer the heat of the magnetic bodies 10A-10F, both of which are alternately arranged; a magnetic unit 2000A comprising a plurality of magnets 21A, 21C, . . . that are arranged so as to face against each of the magnetic bodies 10A-10F of the heat transfer unit 1000A and to selectively apply and remove the magnetic field to/from each of the magnetic bodies 10A-10F; and a motor 350 that moves at least one of the heat transfer unit 1000A and the magnetic unit 2000A facing each other, relative to each other in the direction in which the heat transfer devices 50-1, 50-2, . . . are arranged, wherein a magnetically-permeable heat-insulating part 60 that has the equivalent magnetic permeability to that of the magnetic bodies 10A-10F and blocks heat conduction is formed between the heat transfer devices 50-1, 50-2, . . . of the heat transfer unit 1000A.

9 Claims, 18 Drawing Sheets

(56) References Cited

U.S. PATENT DOCUMENTS

Figure 1:
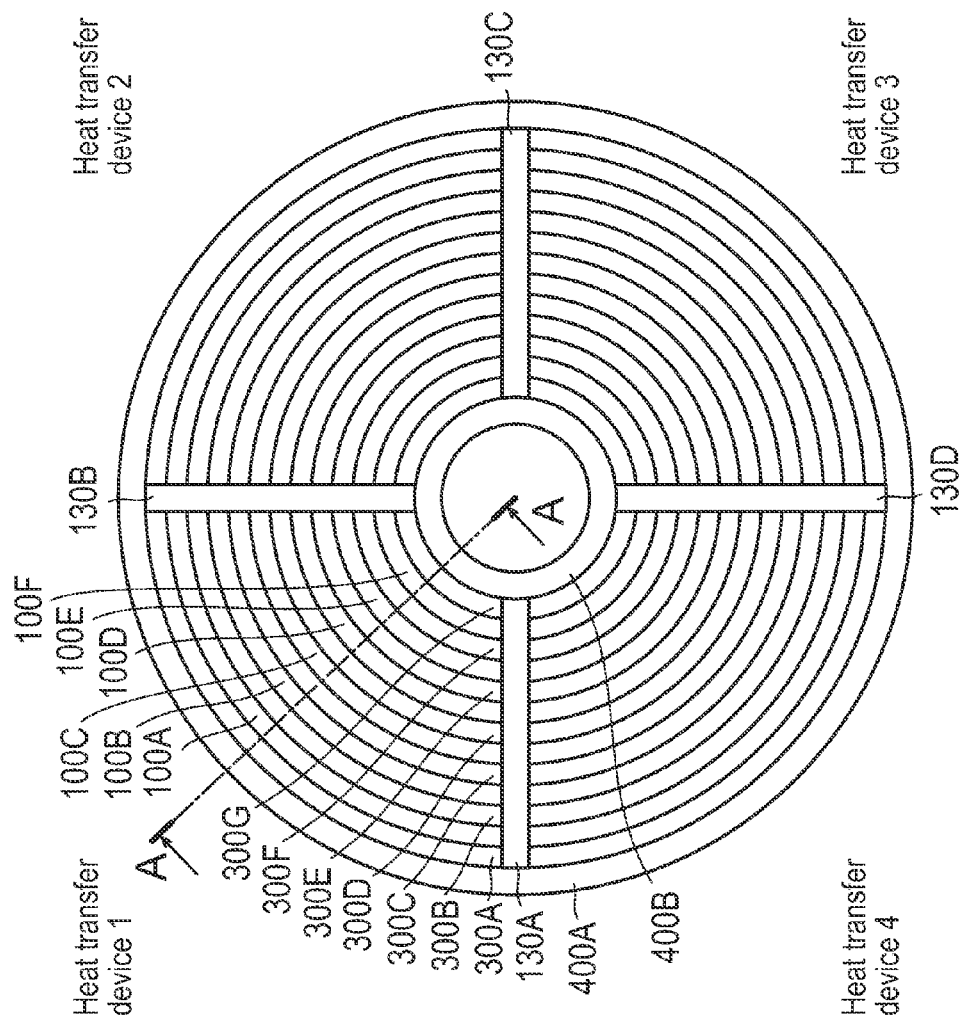

| | | | | |
|---|---|---|---|---|
| 3,413,500 | A | * | 11/1968 | Gomez ................ H02K 49/043 188/164 |
| 3,997,806 | A | * | 12/1976 | Noto ........................ H02K 3/00 310/237 |
| 4,642,994 | A | * | 2/1987 | Barclay .................. F25B 21/00 505/890 |
| 4,956,976 | A | * | 9/1990 | Kral ........................ F25B 21/00 62/3.1 |
| 7,481,064 | B2 | * | 1/2009 | Kitanovski .............. F25B 21/00 62/3.1 |
| 2002/0053209 | A1 | * | 5/2002 | Zimm ..................... F25B 21/00 62/3.1 |
| 2003/0106323 | A1 | * | 6/2003 | Zimm ..................... F25B 21/00 62/3.1 |
| 2007/0125094 | A1 | | 6/2007 | Iwasaki et al. |
| 2009/0308080 | A1 | * | 12/2009 | Han ........................ F25B 21/00 62/3.1 |
| 2010/0071383 | A1 | * | 3/2010 | Zhang ..................... F25B 21/00 62/3.1 |
| 2011/0067415 | A1 | | 3/2011 | Mao et al. |
| 2014/0075958 | A1 | | 3/2014 | Takahashi et al. |

FOREIGN PATENT DOCUMENTS

| | | |
|---|---|---|
| JP | 2007-147209 A | 6/2007 |
| WO | WO 2012/150681 A1 | 11/2012 |

\* cited by examiner

MAGNETIC HEATING/COOLING APPARATUS

TECHNICAL FIELD

The present invention relates to a magnetic cooling/heating apparatus, particularly to a magnetic cooling/heating apparatus that can reduce fluctuation in the driving force.

BACKGROUND ART

A majority of conventionally used refrigerating machines for a room temperature range such as a refrigerator, a freezer, and an air conditioner utilize the phase transition of a gaseous refrigerant such as CFC (chlorofluorocarbon) or a CFC substitute. Recently, the destruction of the ozone layer caused by the discharge of CFC has been revealed, and there have been concerns regarding the influence to the global warming in conjunction with the discharge of a CFC substitute. For this reason, it is strongly desired to develop an innovative refrigerating machine that is pollution-free, has a high heat-transfer capability, and replaces a refrigerating machine that uses a gaseous refrigerant such as CFC or a CFC substitute.

Due to the above-described background, the refrigerating technique that has recently been caught attention is the magnetic refrigerating technique. Among magnetic substances, there is a substance that exhibits so-called a magneto-caloric effect, in which when a magnetic field applied to the magnetic substance changes in magnitude, the magnetic substance changes its own temperature in accordance with the magnitude change of the magnetic field. The refrigerating technique using the magneto-caloric effect to transfer heat is referred to as the magnetic refrigerating technique.

As a magnetic refrigerating machine applying the magneto-caloric effect, there is a magnetic refrigerating machine utilizing heat conduction of a solid substance to transfer heat as described in Patent Document 1 below, for example. This magnetic refrigerating machine transfers heat by the following configuration.

The positive magnetic bodies that raise their own temperature upon the application of a magnetic field thereto and the negative magnetic bodies that lower their own temperature upon the application of a magnetic field thereto are alternately arranged in one direction at a predetermined interval. A magnetic body block is formed by a pair of the positive and negative magnetic body. A magnetic body unit is formed by arranging a plurality of the magnetic body blocks lined up in one direction annularly. A magnetic unit is formed by arranging permanent magnets on a rotary body having a hub shape, in which the inner diameter and the outer diameter are almost equal and which is concentric with the magnetic body unit. A heat-conductive member, that is inserted into and pulled out of a space between the positive and negative magnetic bodies, is arranged so as to freely slide between the positive and negative magnetic bodies.

The magnetic unit in which the permanent magnets are disposed is arranged so as to face the magnetic body unit and rotate relative to the magnetic body unit. The heat-conductive member that is inserted into and pulled out of the space between the positive and negative magnetic bodies is set to rotate relative to the magnetic body unit. The rotation of the magnetic unit causes a magnetic field to be simultaneously applied to or removed from the positive and negative magnetic bodies. Also, the heat-conductive member is inserted into or pulled out of the space between the positive and negative magnetic bodies arranged in the rotational direction. The rotation of the permanent magnets and the heat-conductive members causes the heat generated by the magneto-caloric effect of the magnetic bodies to be transferred via the heat-conductive member in one direction in which the magnetic bodies are arranged.

RELATED ART DOCUMENT

Patent Document

[Patent Document 1] Japanese Unexamined Patent Application Publication No. 2007-147209

SUMMARY OF THE INVENTION

Problems to be Solved by the Invention

However, in the case of the invention described in the above Patent Document 1, within the magnetic body unit an air gap for blocking heat conduction is formed between the magnetic bodies adjoining in the rotational direction of the magnetic unit. For this reason, a large reaction force momentarily acts on the magnetic unit when the permanent magnets pass between the magnetic bodies. As a result, a fluctuation in the driving force occurs. This is because the lines of magnetic force are disturbed when the permanent magnets pass between the magnetic bodies.

Also, a plurality of magnetic body units and magnetic units are layered, and the arrangement of the magnetic bodies of the each magnetic body unit and the arrangement of the permanent magnets of the each magnetic unit are all the same in the layer direction. For example, the positions of the above-described air gaps between the magnetic bodies are aligned in the layer direction. For this reason, the above-described fluctuation in the driving force for the magnetic units is accumulated by the number of the layered magnetic units and thus becomes considerably large.

The fluctuation in the driving force for the magnetic unit leads to the following inconveniences.

First, a capacity of the motor driving the magnetic unit is to be set large, considering the fluctuation in the driving force. For this reason, the motor size is made large, and the consumed electric power becomes large, resulting in undesirable influence to the downsizing of the motor and the energy efficiency of the refrigerating machine. Further, since the fluctuation in the driving force periodically occurs while the magnetic unit completes one rotation, the fluctuation in the driving force becomes a source of a noise and vibration in the refrigerating machine.

The present invention has been made in order to reduce the various existing inconveniences as described above, and it is an object of the present invention to provide a magnetic cooling/heating apparatus that can reduce a fluctuation in a driving force.

Means for Solving the Problems

In order to accomplish the above-described object, a magnetic cooling/heating apparatus according to the present invention comprises a heat transfer unit, a magnetic unit, and a motor.

Effects of Invention

The heat transfer unit comprises a plurality of heat transfer devices arranged in parallel at intervals, wherein the heat transfer device comprises magnetic bodies with a magneto-caloric effect and heat-conductive parts that transfer the heat of the magnetic bodies, both of which are alternately arranged. The magnetic unit comprises a plurality of magnets that are arranged so as to face against each of the magnetic bodies of the heat transfer unit and to selectively apply and remove the magnetic field to/from each of the magnetic bodies. The motor moves at least one of the heat transfer unit and the magnetic unit facing each other, relative to each other in an arrangement direction of the heat transfer device. A magnetically-permeable heat-insulating part that has the equivalent magnetic permeability to that of the magnetic bodies and blocks heat conduction is formed between the heat transfer devices of the heat transfer unit.

Effect of the Invention

According to the magnetic cooling/heating apparatus of the present invention, since the fluctuation in the driving force for the heat transfer unit or the magnetic unit can be made small, the motor for driving the magnetic cooling/heating apparatus can be made small, and electric power consumed by the motor can be decreased. As a result, the energy efficiency of the magnetic cooling/heating apparatus can be enhanced, and the magnetic cooling/heating apparatus with a smaller noise and smaller vibration can be achieved as well.

BRIEF DESCRIPTION OF THE DRAWINGS FIG. 1 An illustration for the operational principle of a magnetic cooling/heating apparatus according to the present invention, and shows a configuration of a heat transfer unit in which a plurality of heat transfer devices is arranged.

Figure 2:
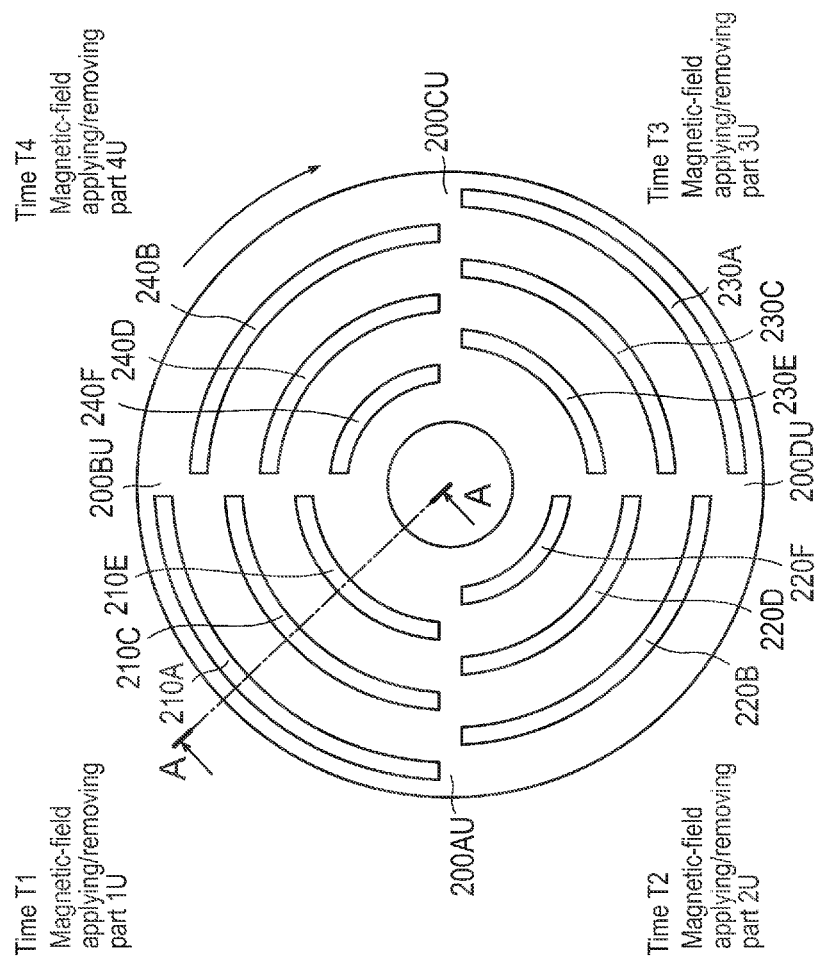

FIG. 2 An illustration for the operational principle of the magnetic cooling/heating apparatus according to the present invention, and shows a configuration of an upside magnetic unit in which a plurality of magnetic-field applying/removing parts is arranged.

Figure 3:
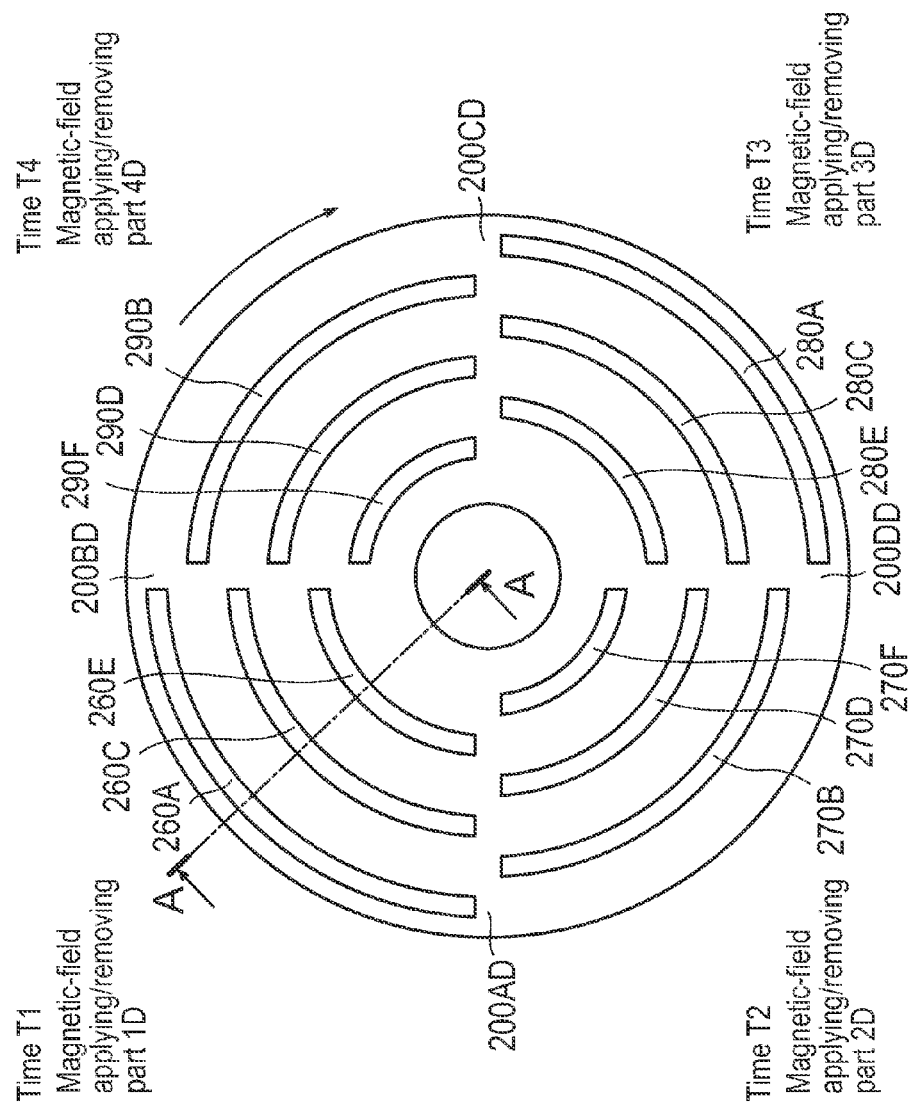

FIG. 3 An illustration for the operational principle of the magnetic cooling/heating apparatus according to the present invention, and shows a configuration of a downside magnetic unit in which a plurality of magnetic-field applying/removing parts is arranged.

Figure 4:
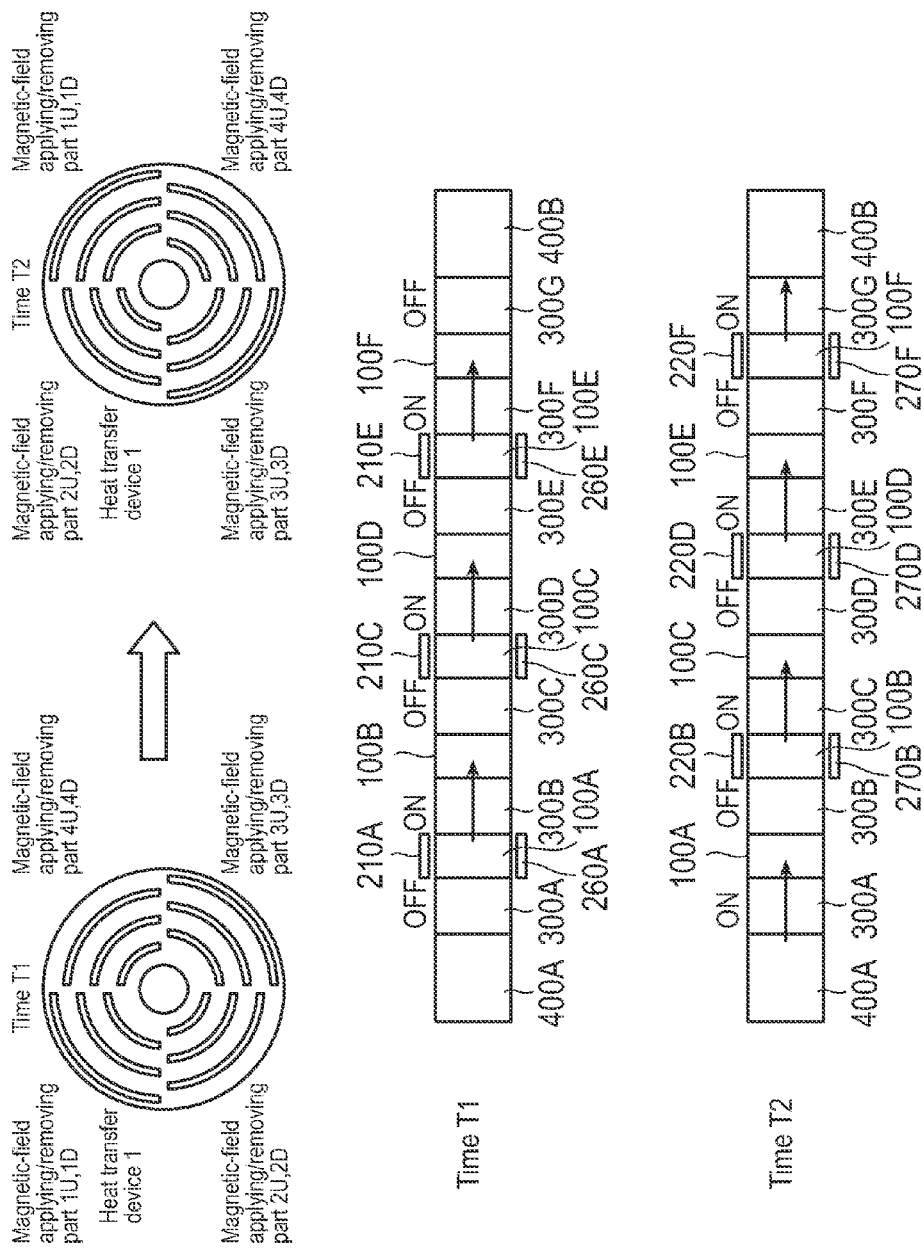

FIG. 4 An illustration for the operational principle of the magnetic cooling/heating apparatus according to the present invention.

Figure 5:
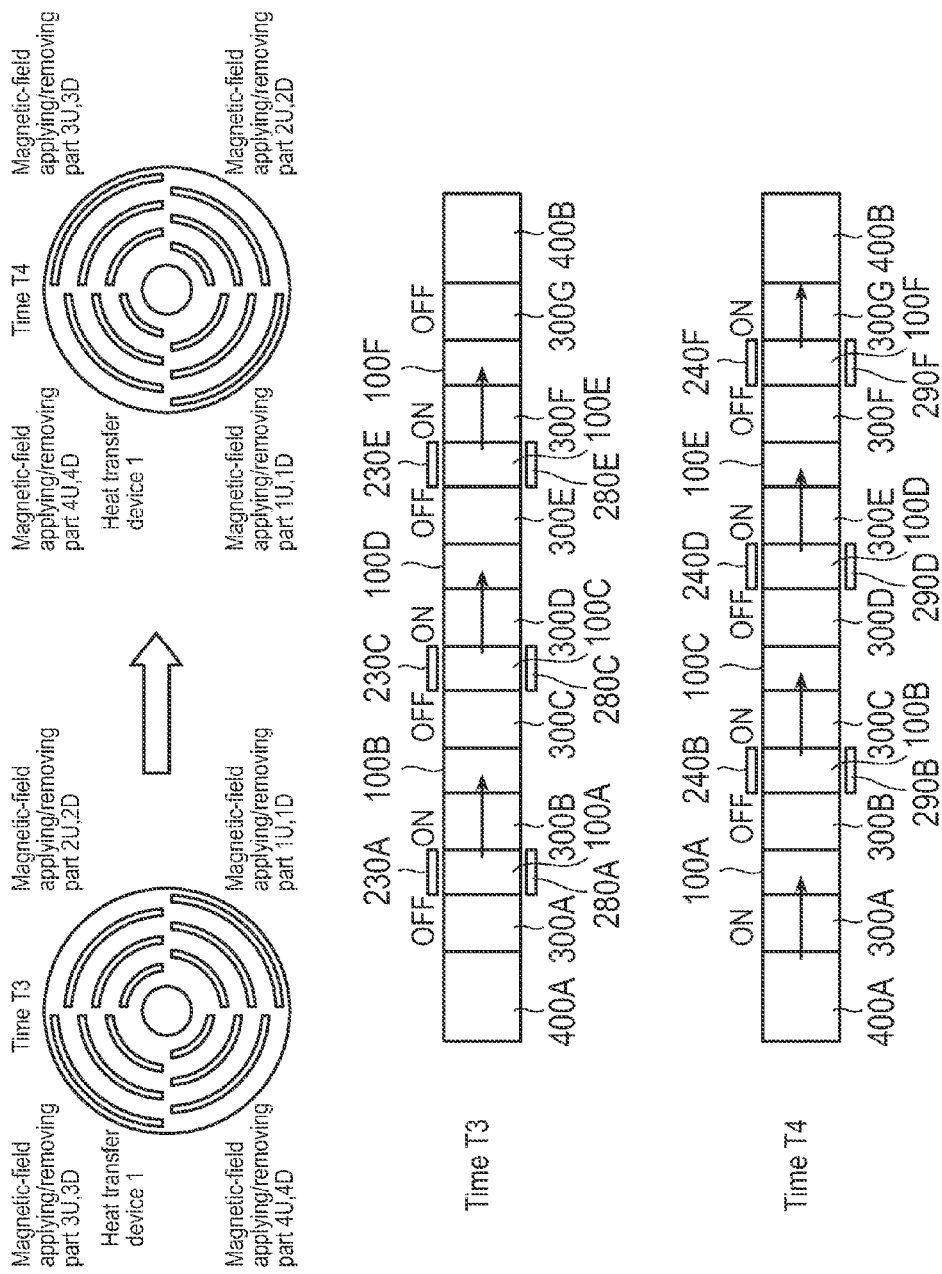

FIG. 5 An illustration for the operational principle of the magnetic cooling/heating apparatus according to the present invention.

Figure 6:
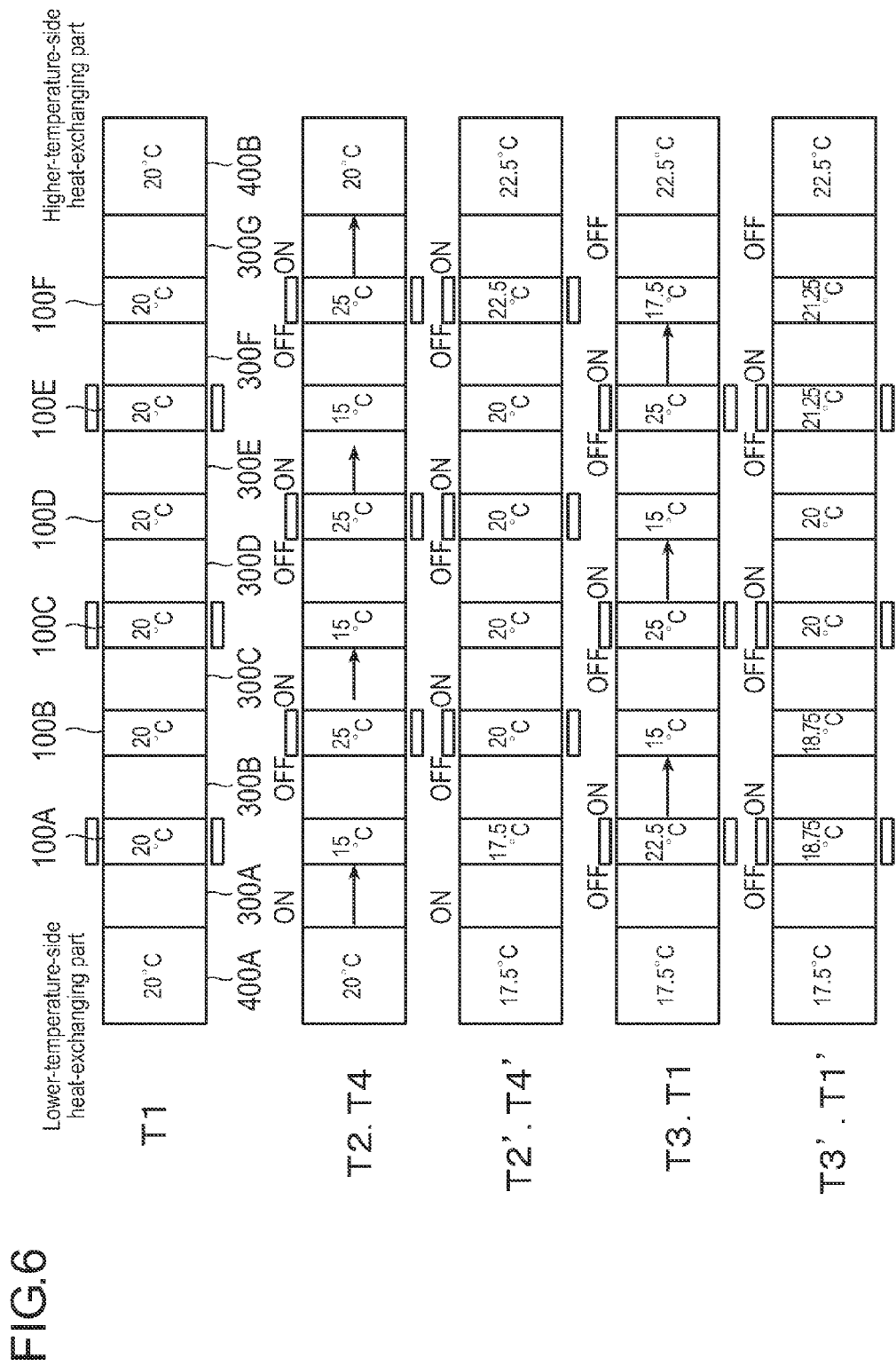

FIG. 6 A process of heat conduction in the magnetic cooling/heating apparatus according to the present invention.

Figure 7:
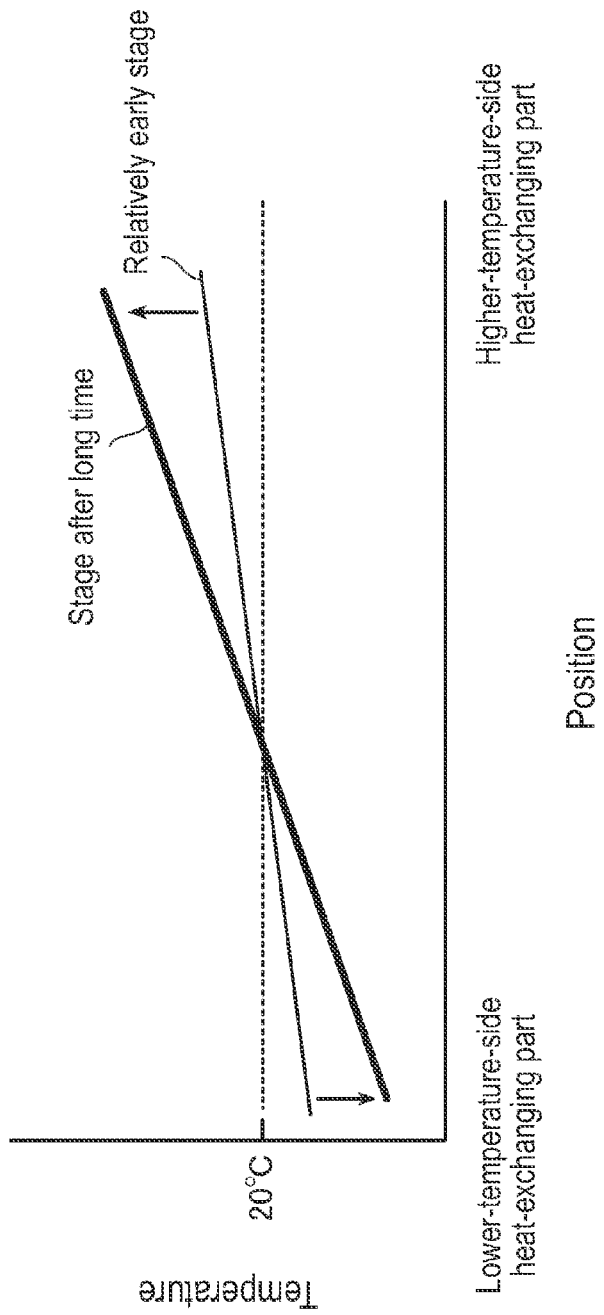

FIG. 7 A graph showing an effect of the magnetic cooling/heating apparatus according to the present invention.

Figure 8:
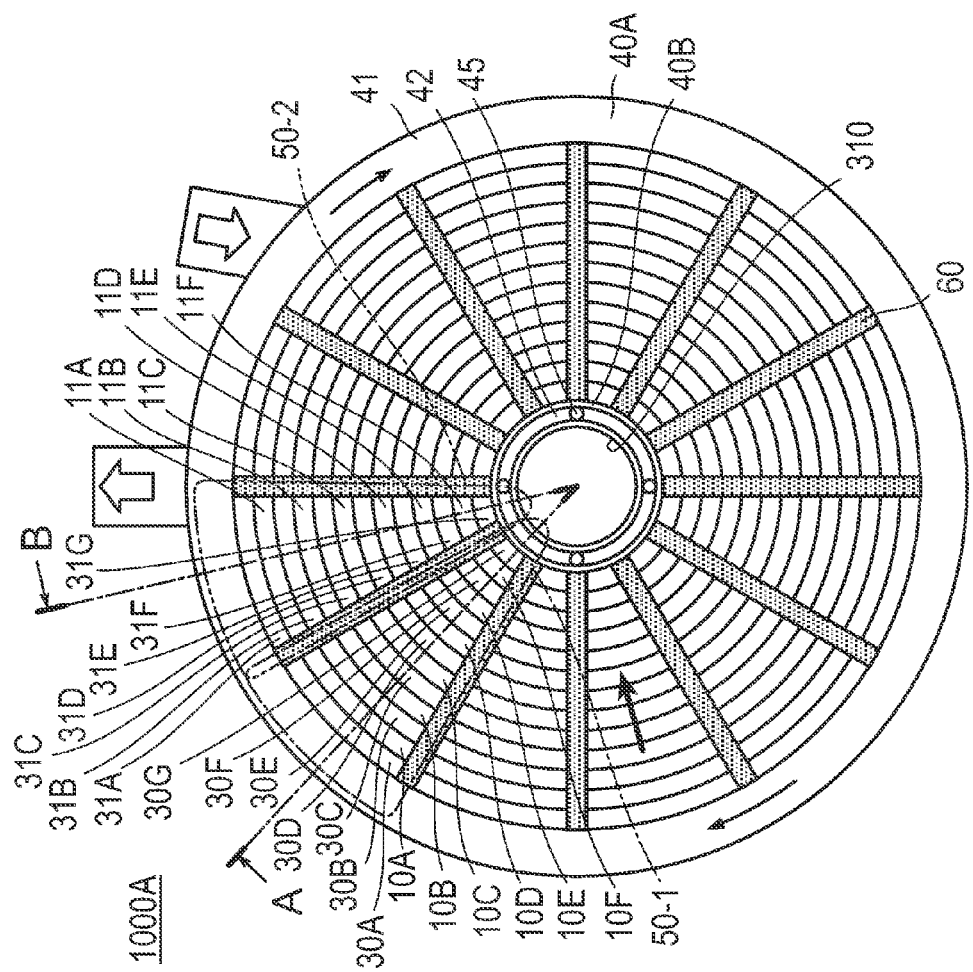

FIG. 8 A configuration of the heat transfer unit of the magnetic cooling/heating apparatus according to Embodiment 1.

Figure 9:
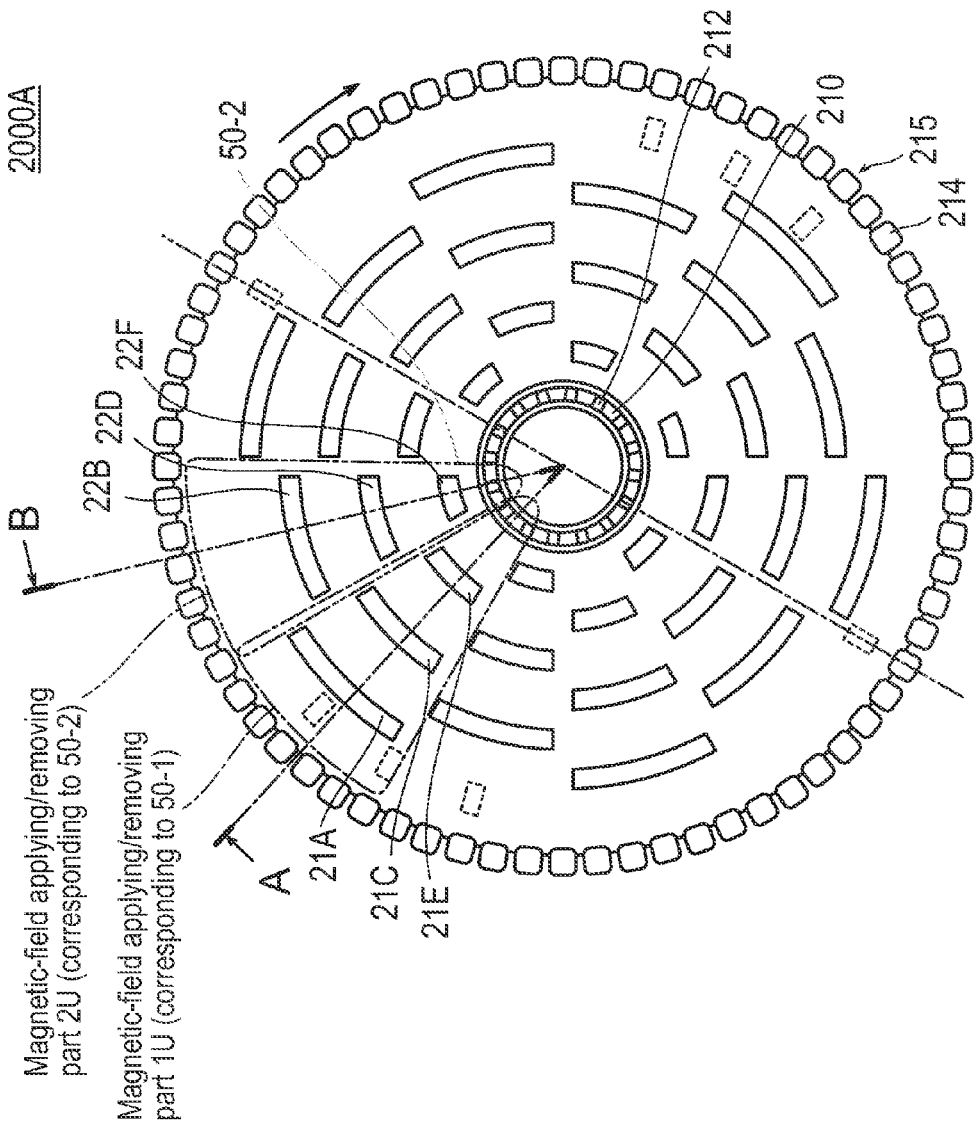

FIG. 9 A configuration of an upside magnetic unit for sandwiching the heat transfer unit of FIG. 8.

Figure 10:
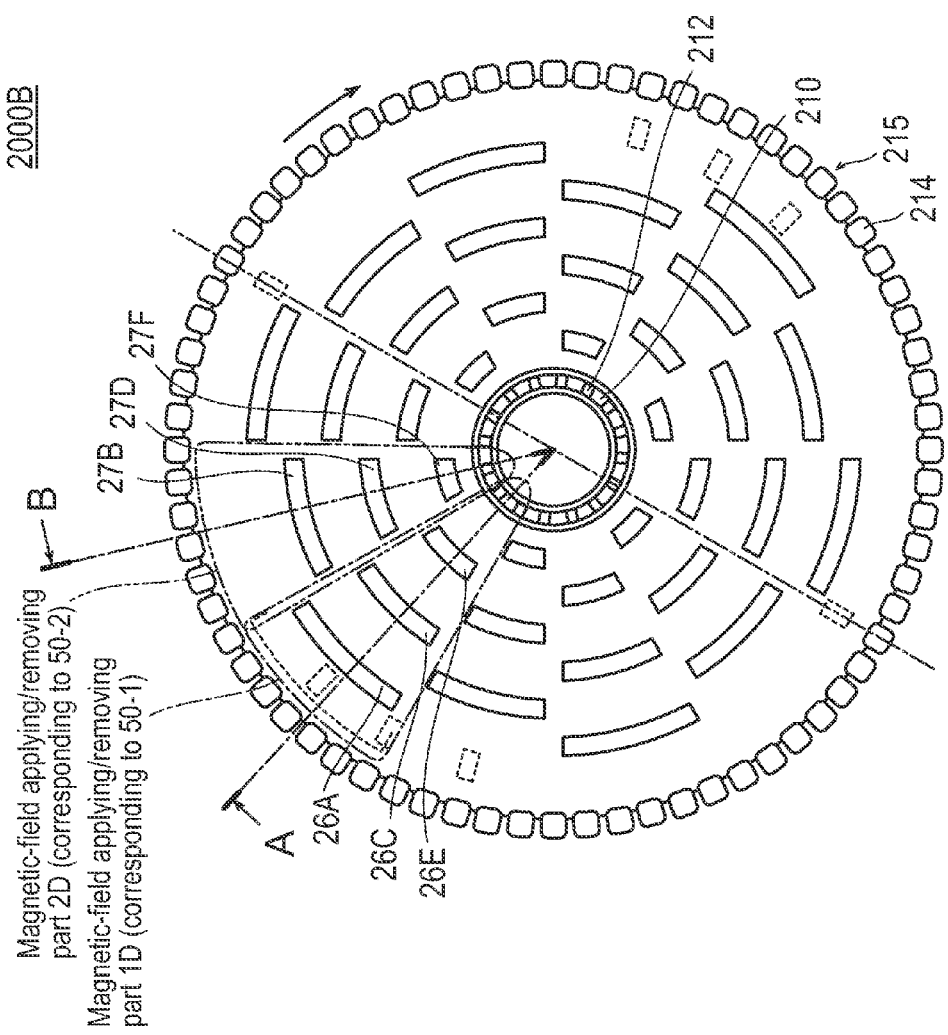

FIG. 10 A configuration of a downside magnetic unit for sandwiching the heat transfer unit of FIG. 8.

Figure 11:
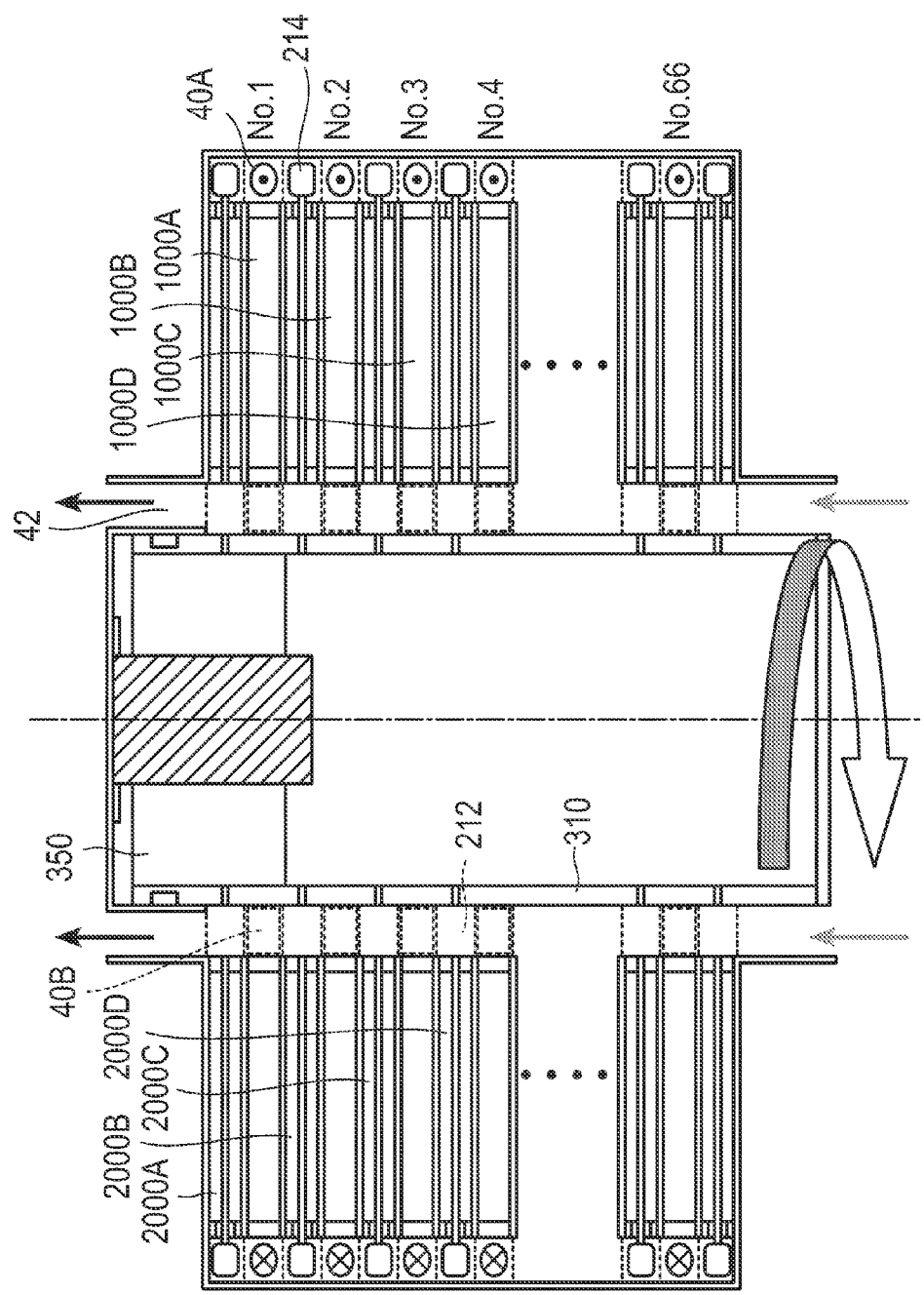

FIG. 11 A sectional view of the magnetic cooling/heating apparatus according to Embodiment 1

Figure 12:
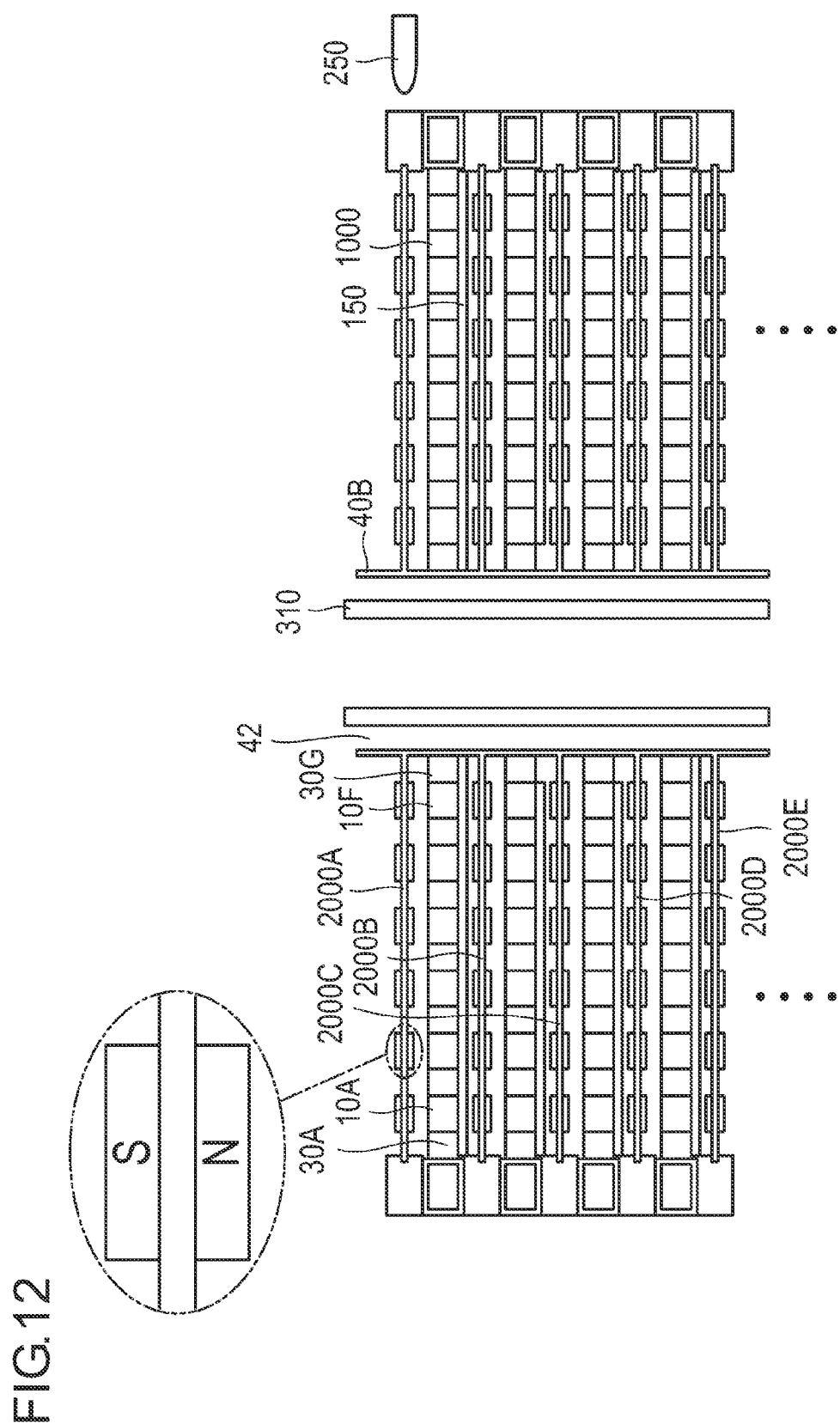

FIG. 12 A sectional view of the heat transfer unit and both of the magnetic units of the magnetic cooling/heating apparatus of FIG. 11.

Figure 13:
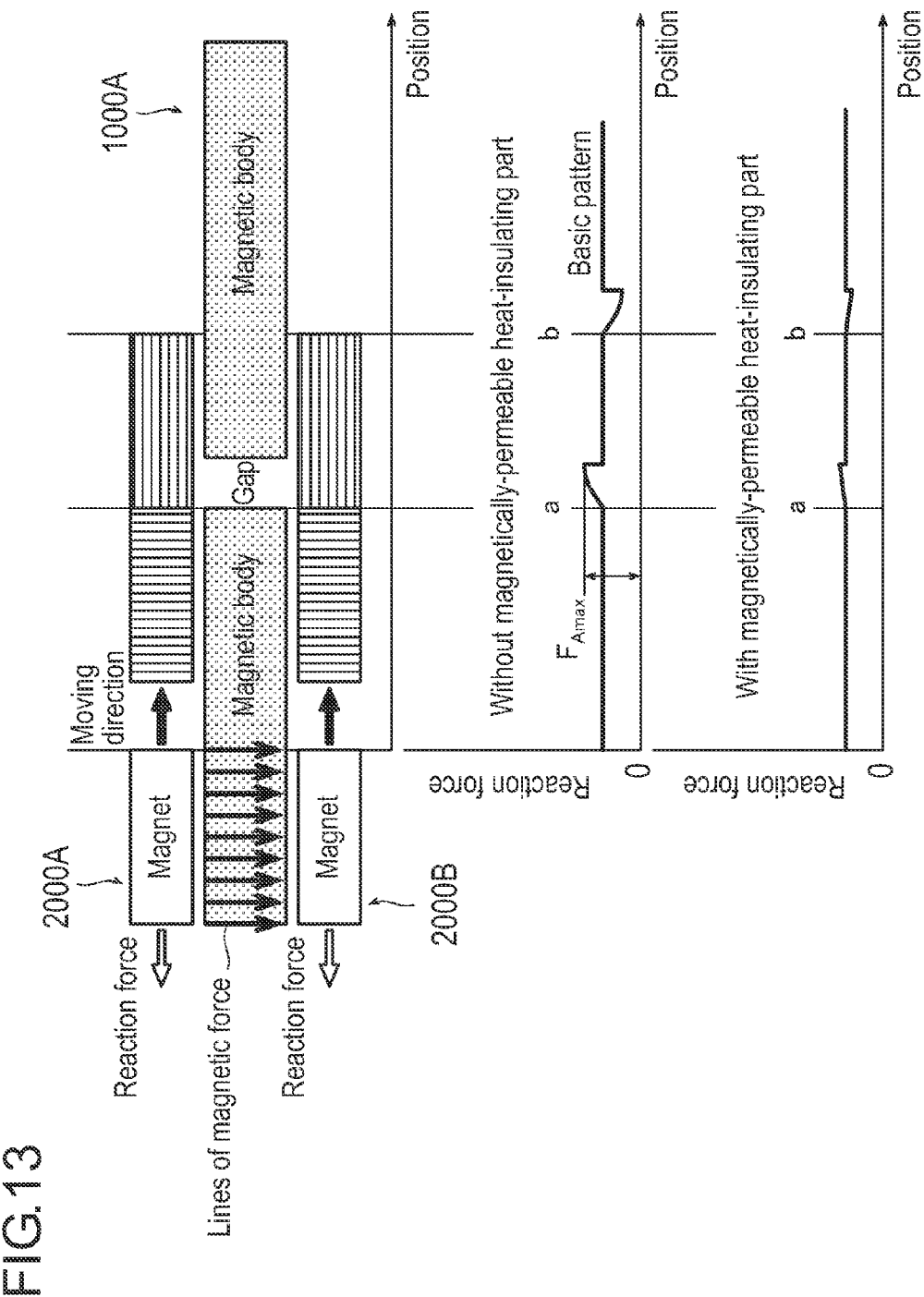

FIG. 13 An effect of a magnetically-permeable heat-insulating part provided in the heat transfer unit.

Figure 14:
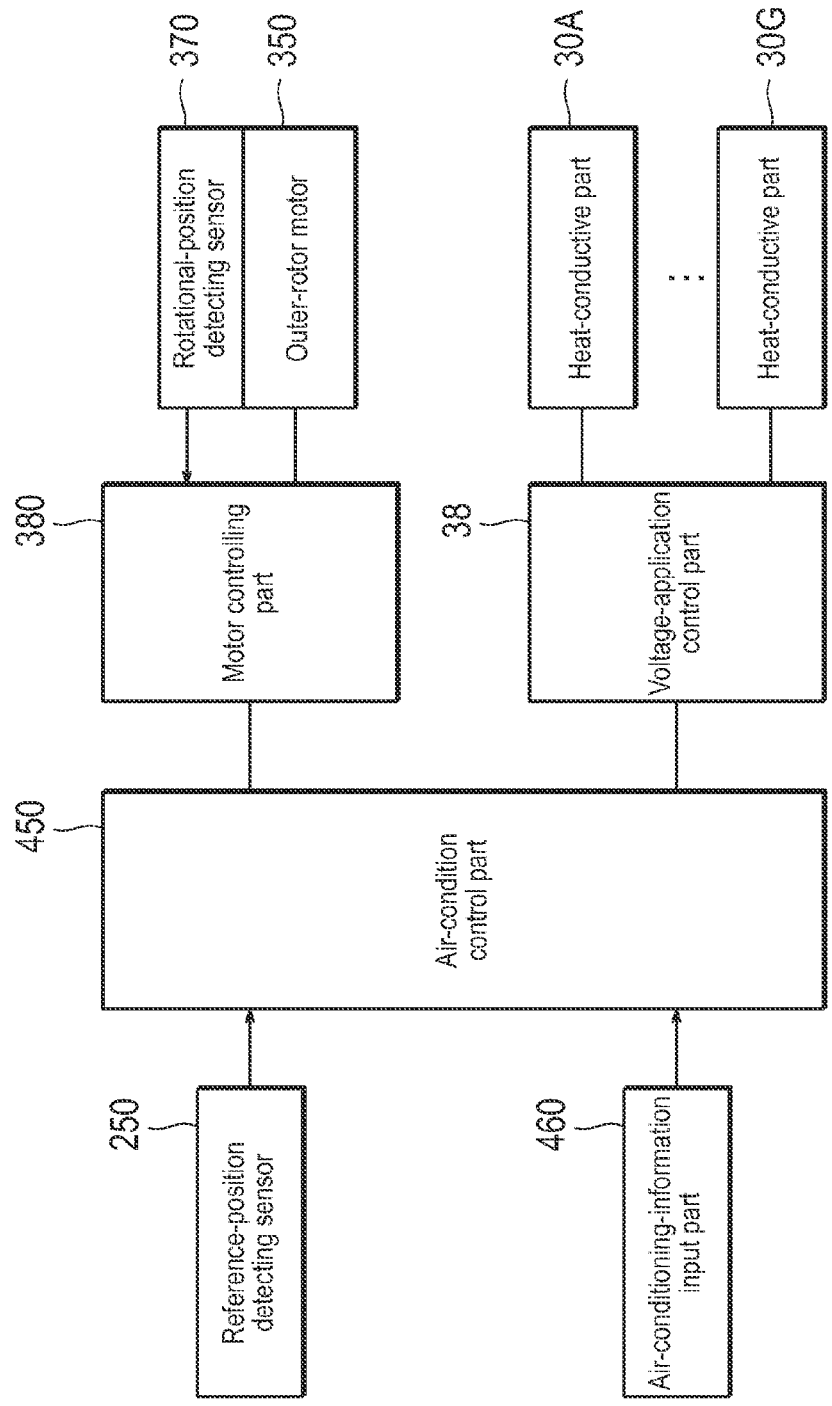

FIG. 14 A block diagram showing a controlling system of the magnetic cooling/heating apparatus according to Embodiment 1.

Figure 15:
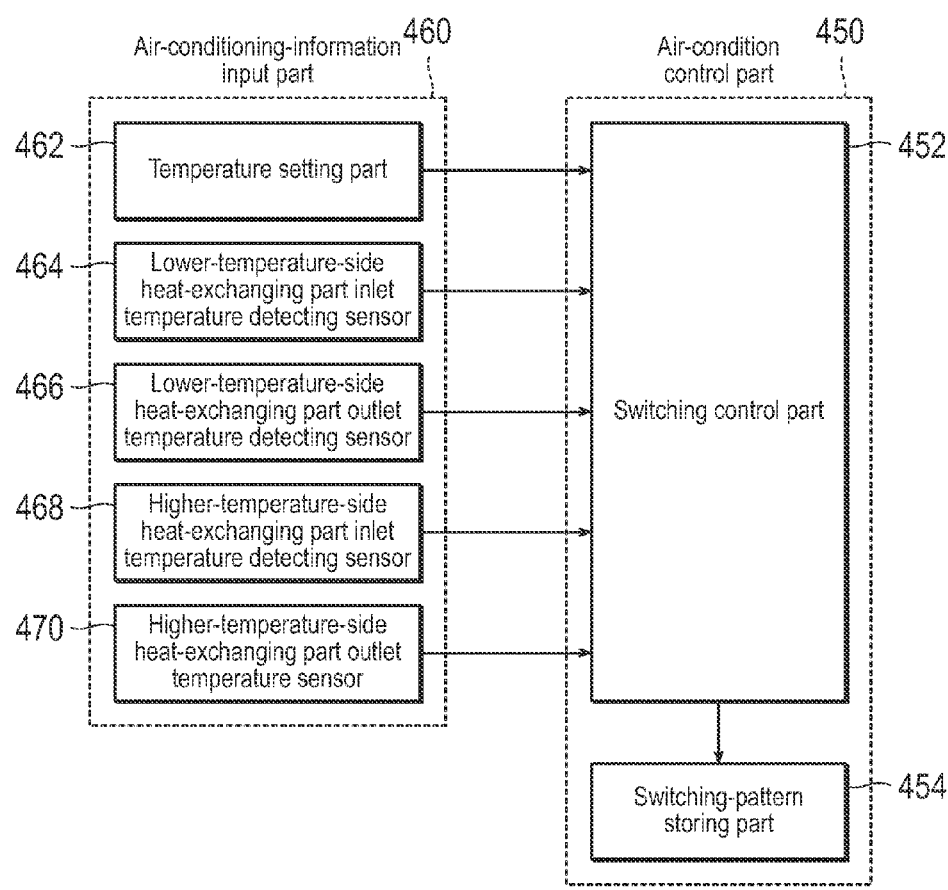

FIG. 15 A block diagram of more detailed controlling system for an air-conditioning control part and an air-conditioning-information input part in FIG. 14.

Figure 16:
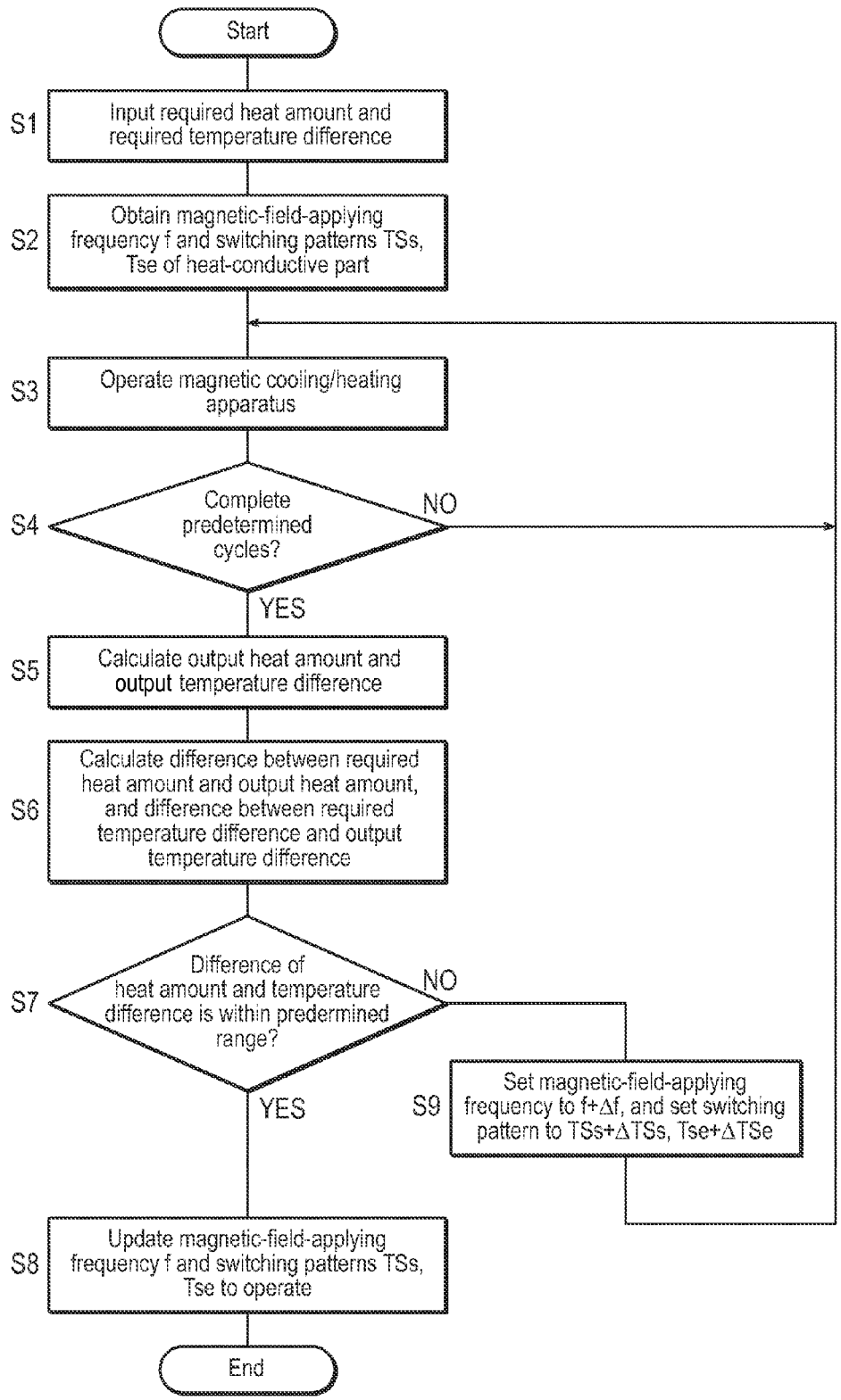

FIG. 16 An operational flowchart of the magnetic cooling/heating apparatus in FIG. 14.

Figure 17:
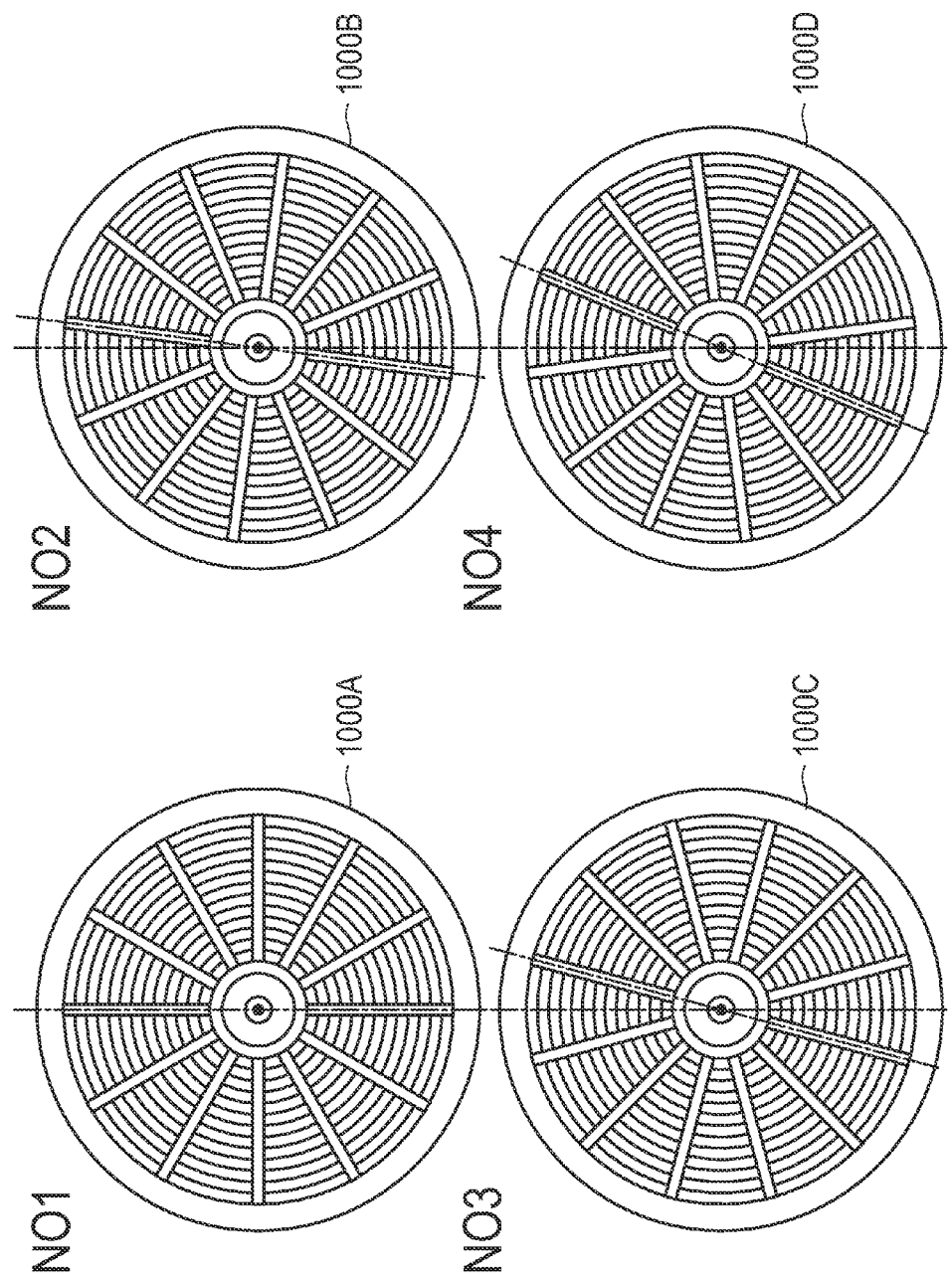

FIG. 17 A configuration of heat transfer units of a magnetic cooling/heating apparatus according to Embodiment 2.

Figure 18:
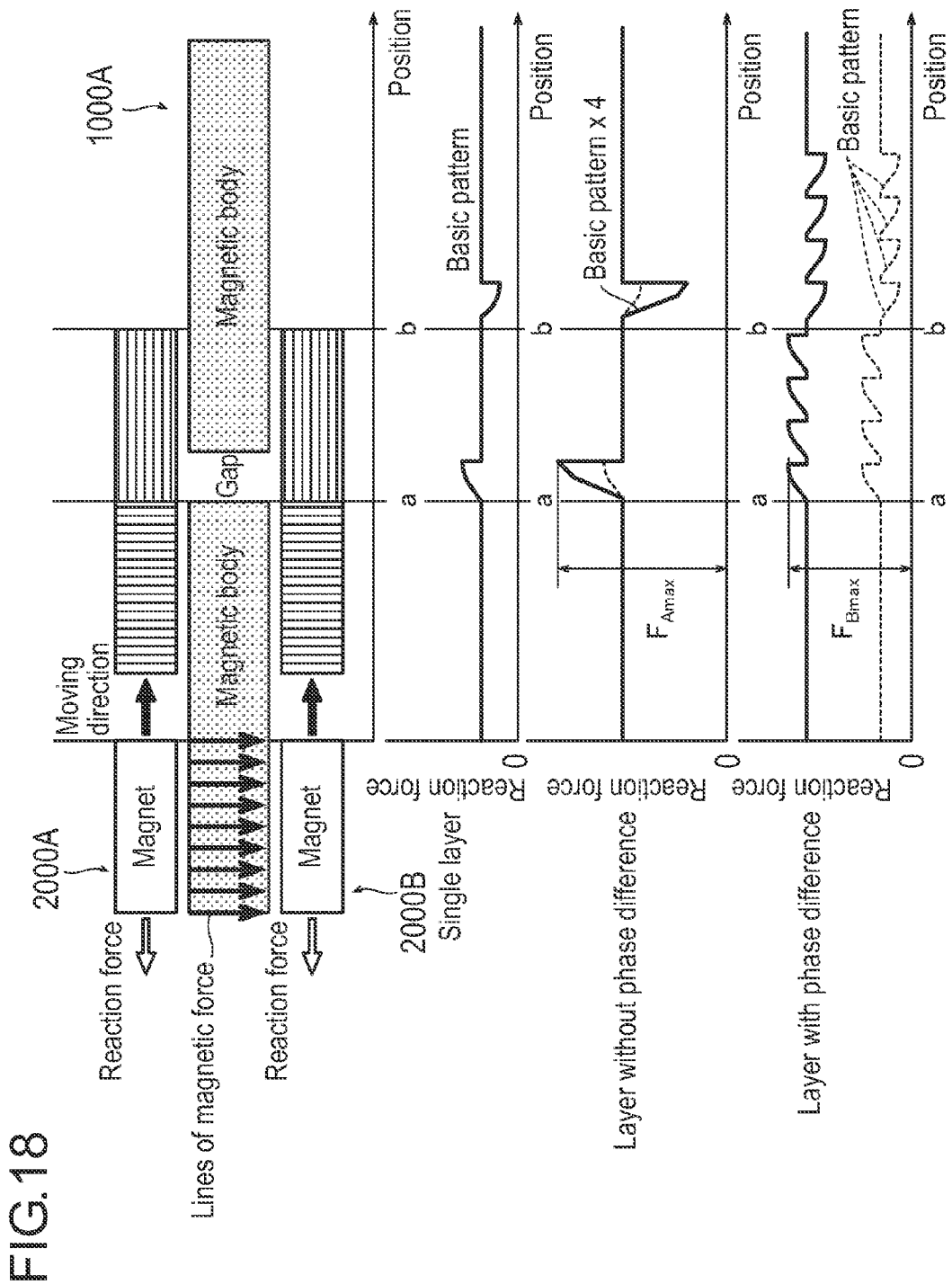

FIG. 18 An effect in the case where heat transfer units are arranged in a layer direction with phase difference from one another.

EMBODIMENTS FOR CARRYING OUT THE INVENTION

Before the description of each embodiment, the operational principle of a magnetic cooling/heating apparatus according to the present invention will be described.
(Operational Principle of Magnetic Cooling/Heating Apparatus)
<Configuration of Heat Transfer Unit>

FIG. 1 shows a heat transfer unit in which a plurality of heat transfer devices is arranged. The circular heat transfer unit includes four heat transfer devices 1 to 4 divided by dividing portions 130A to 130D. Each heat transfer device conducts heat from a lower-temperature-side heat-exchanging part 400A to a higher-temperature-side heat-exchanging part 400B. Each heat transfer device is formed by alternately arranging a magnetic body and a heat-conductive part. For the magnetic bodies, positive magnetic bodies are used, wherein the magnetic body is made of the same magnetic substance that exhibits the same type of a magneto-caloric effect. For the heat-conductive parts, a substance with the property in which the thermal conductivity greatly changes by applying or removing a voltage is used. Applying a voltage (ON) causes the thermal conductivity of the heat-conductive part to increase, and removing a voltage (OFF) causes the thermal conductivity of the heat-conductive part to decrease. For this reason, the heat-conductive part enables or disables heat to be conducted to the magnetic bodies by controlling the application and removal of a voltage Thereby, heat can be efficiently transferred in the arrangement direction of the magnetic bodies.

For example, in the heat transfer device 1, the magnetic bodies 100A to 100E and the heat-conductive bodies 300A to 300G are alternately arranged. Specifically, heat is transferred from lower-temperature-side heat-exchanging part 400A through the arrangements of the magnetic bodies and the heat-conductive bodies in the order of the heat-conductive part 300A, the magnetic body 100A, the heat-conductive part 300B, the magnetic body 100B, the heat-conductive part 300C, the magnetic body 100C, the heat-conductive part 300D, the magnetic body 100D, the heat-conductive part 300E, the magnetic body 100E, the heat-conductive part 300F, the magnetic body 100F, and the heat-conductive part 300C to reach the higher-temperature-side heat-exchanging part 400B. The-lower-temperature-side heat-exchanging part 400A and the heat-conductive part 300A are connected without a gap, each heat-conductive part and each magnetic body from the heat-conductive part 300A to the heat-conductive part 300G are connected without a gap, and the heat-conductive part 300G and the higher-temperature-side heat-exchanging part 400B are connected without a gap. The heart transfer devices 2 to 4 have the same configuration as that of the heat transfer device 1.

<Configuration of Magnetic Unit>

The magnetic units shown in FIGS. 2 and 3 sandwich the heat transfer unit shown in FIG. 1 from the both sides in the vertical direction with a constant gap therebetween. The magnetic units have the following configuration.

FIG. 2 shows the configuration of the upside magnetic unit in which a plurality of magnetic-field applying/removing parts is arranged. The upside circular magnetic unit includes the four magnetic-field applying/removing parts 1U to 4U divided by dividing parts 200AU to 200DU. The upside magnetic unit shown in FIG. 2 is supported freely rotatable clockwise by positioning the front side of FIG. 2 to face the front side of the heat transfer unit shown in FIG. 1, and by aligning the center of the upside magnetic unit with the center of the heat transfer unit. FIG. 2 illustrates a state in which the upside magnetic unit positioned to face the heat transfer unit is seen through from the upside toward the heat transfer unit.

The magnetic-field applying/removing part 1U, at the time T1 when the magnetic-field applying/removing part 1U faces against the heat transfer device 1, comprises a permanent magnet 210A facing the magnetic body 100A, a permanent magnet 210C facing the magnetic body 100C, and a permanent magnet 210E facing the magnetic body 100E from the outer circumference to the inner circumference of the magnetic unit.

The magnetic-field applying/removing part 2U, at the time T2 when the magnetic-field applying/removing part 2U faces against the heat transfer device 1, comprises a permanent magnet 220B facing the magnetic body 100B, a permanent magnet 220D facing the magnetic body 100D, and a permanent magnet 220F facing the magnetic body 100F from the outer circumference to the inner circumference of the magnetic unit.

Since the magnetic-field applying/removing part 3U and the magnetic-field applying/removing part 4U are arranged point-symmetrically with respect to the center of the upside magnetic unit, the arrangement of their permanent magnets is the same as that of the magnetic-field applying/removing part 1U and the magnetic-field applying/removing part 2U. The magnetic-field applying/removing part 3U faces against the heat transfer device 1 at the time T3, and the magnetic-field applying/removing part 4U faces against the heat transfer device 1 at the time T4.

FIG. 3 illustrates the configuration of the downside magnetic unit in which a plurality of magnetic-field applying/removing parts is arranged.

The downside circular magnetic unit comprises the four magnetic-field applying/removing parts 1D to 4D divided by dividing parts 200AD to 200DD. The downside magnetic unit shown in FIG. 3 is supported freely rotatable clockwise by positioning the front side of FIG. 3 to face the back side of the heat transfer unit shown in FIG. 1, and by aligning the center of the downside magnetic unit with the center of the heat transfer unit. FIG. 3 illustrates a state in which the downside magnetic unit positioned to face the heat transfer unit is seen through from the heat transfer unit side.

The magnetic-field applying/removing part 1D, at the time T1 when the magnetic field applying/removing part 1D faces against the heat transfer device 1, comprises a permanent magnet 260A facing the magnetic body 100A, a permanent magnet 260C facing the magnetic body 100C, and a permanent magnet 260E facing the magnetic body 100E from the outer circumference to the inner circumference of the magnetic unit.

The magnetic-field applying/removing part 2D, at the time T2 when the magnetic-field applying/removing part 2D faces against the heat transfer device 1, comprises a permanent magnet 270B facing the magnetic body 100B, a permanent magnet 270D facing the magnetic body 100D, and a permanent magnet 270F facing the magnetic body 100F from the outer circumference to the inner circumference of the magnetic unit.

Since the magnetic-field applying/removing part 3D and the magnetic-field applying/removing part 4D are arranged point-symmetrically with respect to the center of the downside magnetic unit, the arrangement of their permanent magnets is the same as that of the magnetic-field applying/removing part 1D and the magnetic-field applying/removing part 2D. The magnetic-field applying/removing part 3D faces against the heat transfer device 1 at the time T3, and the magnetic-field applying/removing part 4D faces against the heat transfer device 1 at the time T4.

Each of the magnetic-field applying/removing parts 1U to 4U of the upside magnetic unit and each of the magnetic-field applying/removing parts 1D to 4D of the downside magnetic unit face each other in vertical direction via each of the heat transfer devices 1 to 4 of the heat transfer unit. The upside magnetic unit and the downside magnetic unit rotate in synchronization without changing the relative positions thereof, such that the dividing parts 200AU to 200DU of the upside magnetic unit always face the dividing parts 200AD to 200DD of the downside magnetic unit.

<Principle of Heat Transfer>

FIG. 4 and FIG. 5 illustrate the operational principle of the magnetic cooling/heating apparatus according to the present invention. FIG. 4 illustrates two states at the time T1 and the time T2. In the state at the time T1, the A-A line of the heat transfer unit in FIG. 1 is aligned with the A-A lines of the upside and downside magnetic units in FIG. 2 and FIG. 3. That is, the heat transfer device 1 of the heat transfer unit faces against the magnetic-field applying/removing part 1U of the upside magnetic unit as well as the magnetic-field applying/removing part 1D of the downside magnetic unit. Also, in the state at the time T2, the heat transfer device 1 of the heat transfer unit faces against the magnetic-field applying/removing part 2U of the upside magnetic unit as well as the magnetic-field applying/removing part 2D of the downside magnetic unit. FIG. 5 shows two states at the time T3 and the time T4. In the state at the time T3, the heat transfer device 1 of the heat transfer unit faces against the magnetic-field applying/removing part 3U of the upside magnetic unit as well as the magnetic-field applying/removing part 3D of the downside magnetic unit. Also, in the state of the time T4, the heat transfer device 1 of the heat transfer unit faces against the magnetic-field applying/removing part 4U of the upside magnetic unit as well as the magnetic-field applying/removing part 4D of the downside magnetic unit.

At the time T1, as shown in FIG. 4, the permanent magnets 210A and 260A are positioned at the magnetic body 100A. Also, the permanent magnets 210C and 266C are positioned at the magnetic body 100C. Also, the permanent magnets 210E and 260E are positioned at the magnetic body 100E. At the time T1, a voltage is applied to the heat-conductive parts 300B, 300D and 300F so that heat can be conducted between the adjoining magnetic bodies 100A and 100B, between 100C and 100D, and between 100E and 100F.

At the time T2, as shown in FIG. 4, the permanent magnets 220B and 270B are positioned at the magnetic body 100B since the upside and downside magnetic units rotate clockwise by 90 degrees from the time T1. Also, the permanent magnets 220D and 270D are positioned at the magnetic body 100D. Also, the permanent magnets 220F and 270F are positioned at the magnetic body 100F. At the time T2, a voltage is applied to the heat-conductive parts 300A, 300C, 300E and 300G so that heat can be conducted between the lower-temperature-side heat-exchanging part 400A and the magnetic body 100A, between the magnetic bodies 100B and 100C, between 100D and 100E, and between the magnetic body 100F and the higher-temperature-side heat-exchanging part 400B.

At the time T3, as shown in FIG. 5, the permanent magnets 230A and 280A are positioned at the magnetic body 100A since the upside and downside magnetic units further rotate clockwise by 90 degrees from the time T2. Also, the permanent magnets 230C and 280C are positioned at the magnetic body 100C. Also, the permanent magnets 230E and 280E are positioned at the magnetic body 100E. At the time T3, a voltage is applied to the heat-conductive bodies 300B, 300D and 300F in the same manner as at the time T1 so that heat can be conducted between the adjoining magnetic bodies 100A and 100B, between 100C and 100D, and between 100E and 100F.

At the time T4, as shown in FIG. 5, the permanent magnets 240B and 290B are positioned at the magnetic body 100B since the upside and downside magnetic units further rotate clockwise by 90 degrees from the time T3. Also, the permanent magnets 240D and 290D are positioned at the magnetic body 100D. Also, the permanent magnets 240F and 290F are positioned at the magnetic body 100F. At the time T4, a voltage is applied to the heat-conductive parts 300A, 300C, 300E and 300G in the same manner as at the time T2 so that heat can be conducted between the lower-temperature-side heat-exchanging part 400A and the magnetic body 100A, between the magnetic bodies 100B and 100C, between 100D and 100E, and between the magnetic body 100F and the higher-temperature-side heat-exchanging part 400B.

Thus, tracking the positional relation of the permanent magnets clarifies that the same positional relation among the permanent magnets, the magnetic bodies and heat-conductive parts at the times T1 and T2 are repeated twice over the time transition from the time T1 to the time T4.

As described above, since a positive magnetic body is used for each magnetic body, applying a magnetic field to the magnetic body causes the magnetic body to generate heat, and removing the magnetic field from the magnetic body causes the magnetic body to absorb heat. Also, since a material with heat conductivity that changes by voltage application or removal is used for the heat-conductive part, applying a voltage causes its heat conductivity to relatively increase, and removing the voltage causes its heat conductivity to relatively decrease.

For this reason, as time lapses from the time T1 to the time T4, heat is conducted from the lower-temperature-side heat-exchanging part 400A to the higher-temperature-side heat-exchanging part 400B, resulting in temperature difference between the lower-temperature-side heat-exchanging part 400A and the higher-temperature-side heat-exchanging part 400B. The principle of the temperature difference generated is as follows.

FIG. 6 illustrates a process of heat conduction in the magnetic cooling/heating apparatus according to the present invention. The process of the heat conduction will be described with reference to FIG. 4 and FIG. 5.

As a precondition, it is assumed that all of the magnetic bodies were formed of the same material, the magneto-caloric effect was the same type for all of the magnetic bodies, and the material with the temperature change rate of 5° C. was used. Specifically, all of the magnetic bodies are assumed to have the property in which applying a magnetic field to the magnetic body causes a temperature of the magnetic body to increase by 5° C., and removing the magnetic field from the magnetic body causes a temperature of the magnetic body to decrease by 5° C. Also, all of the heat-conductive members are assumed to have the property in which applying a voltage to or removing a voltage from the heat-conductive member causes the heat conductivity of the heat-conductive member to increase or decrease in the same manner.

At first, in the state at the initial time T1, the temperatures of all of the magnetic bodies 100A to 100F and the heat-conductive parts 300A to 300G are at a room temperature of 20° C. The magnetic bodies and heat-conductive parts, that are alternately arranged between the lower-temperature-side heat exchanging part 400A and the higher-temperature-side heat-exchanging part 400B, form the heat transfer device.

Next, upon transition to the state of the time T2, the positional relation among the permanent magnets, the magnetic bodies and the heat-conductive parts is changed from the state of the time T1 to the state of the time T2 in FIG. 4. At the time T2, a voltage is applied to the heat-conductive parts 300A, 300C, 300E and 300G. As a result, as shown in FIG. 6, the temperature of the magnetic body 100A falls by 5° C., and heat conduction through the heat-conductive part 300A becomes possible. Thereby, heat is conducted from the lower-temperature-side heat-exchanging part 400A to the magnetic body 100A. Further, the temperatures of the magnetic bodies 100B and 100D rise by 5° C., and the temperatures of the magnetic bodies 100C and 100E fall by 5° C., and heat conduction through the heat-conductive parts 300C and 300E becomes possible. Thereby, heat is conducted from the magnetic body 100B to the magnetic body 100C, and from the magnetic body 100D to the magnetic body 100E. Further, the temperature of the magnetic body 100F rises by 5° C., and heat conduction through the heat-conductive part 300G becomes possible. Thereby, heat is conducted from the magnetic body 100F to the higher-temperature-side heat-exchanging part 400B.

At the state of the time T2, the temperatures of the magnetic bodies 100A, 100C and 100E from which the magnetic fields were removed fall to 15° C., and the temperatures of the magnetic bodies 100B, 100D and 100F to which magnetic fields were applied rise to 25° C. For this reason, as shown in FIG. 6, heat is conducted from the higher-temperature side to the lower-temperature side through the heat-conductive parts 300A, 300C, 300E and 300G.

Such heat conduction, as shown in the state of the time T2' in FIG. 6, leads to the state in which the temperatures of the magnetic body 100A and the lower-temperature-side heat-exchanging part 400A become 17.5° C., and the temperatures of the magnetic body 100F and the higher-temperature-side heat-exchanging part 400B become 22.5° C.

Next, upon transition from the state of the time T2' to the state of the time T3, the positional relation among the permanent magnets, magnetic bodies and heat-conductive parts is changed from the state of the time T2 in FIG. 4 to the state of the time T3 in FIG. 5. At the time T3, a voltage is applied to the heat-conductive parts 300B, 300D and 300F. As a result, the temperatures of the magnetic bodies 100A, 100C and 100E rise by 5° C., and the temperatures of the magnetic bodies 100B, 100D and 100F fall by 5° C. And, heat conduction through the heat-conductive parts 300B, 300D and 300F becomes possible. Thereby, heat is conducted from the magnetic body 100A to the magnetic body 100B, from the magnetic body 100C to the magnetic body 100D, and from the magnetic body 100E to the magnetic body 100F.

At the state of the time T3, the temperatures of the magnetic bodies 100A, 100C and 100E to which magnetic fields are applied rise to 22.5° C. or 25° C., and the temperatures of the magnetic bodies 100B, 100D and 100F from which the magnetic fields are removed fall to 15° C. or 17.5° C. For this reason, as shown in FIG. 6, heat is conducted from the higher-temperature side to the lower-temperature side through the heat-conductive parts 300B, 300D, and 300F.

As a result of such heat conduction, as shown in the state of the time T3' in FIG. 6, the temperature of the lower-temperature-side heat-exchanging part 400A becomes 17.5° C., and the temperatures of the magnetic bodies 100A and 100B become 18.75° C. The temperatures of the magnetic bodies 100C and 100D become 20° C., and the temperatures of the magnetic bodies 100E and 100E become 21.25° C. The temperature of the higher-temperature-side heat-exchanging part 400B remains at 22.5° C.

Next, upon transition from the state of the time T3' to the state of the time T4, the positional relation among the permanent magnets, the magnetic bodies and the heat-conductive parts is changed to the same state as that of the time T2 in FIG. 4. At the time T4, a voltage is applied to the heat-conductive parts 300A, 300C, 300E and 300G in the same manner as at the time T2. This results in the state as shown at the times T2 and T4 of FIG. 6, whereby heat is conducted from the lower-temperature-side heat-exchanging part 400A to the magnetic body 100A, from the magnetic body 100B to the magnetic body 100C, from the magnetic body 100D to the magnetic body 100E, and from the magnetic body 100F to the higher-temperature-side heat-exchanging part 400B.

As described above, each time the upside magnetic unit and the downside magnetic unit completes one rotation in synchronization with each other, the transition from the state of the time T1 to the state of the time T4 is repeated. As a result, heat is conducted from the lower-temperature-side heat-exchanging part 400A to the higher-temperature-side heat-exchanging part 400B. As time lapses, as shown in FIG. 7, the temperature difference between the lower-temperature-side heat-exchanging part 400A and the higher-temperature-side heat-exchanging part 400E becomes larger. At last, the temperature difference between the lower-temperature-side heat exchanging part 400A and the higher-temperature-side heat-exchanging part 400B is stabilized. In this state, the heat of the lower-temperature-side heat-exchanging part 400A is used to decrease a room temperature for example, and the heat of the higher-temperature-side heat-exchanging part 400B is used to increase a room temperature, for example.

The description about FIGS. 1 to 7 can be applied to the case of using positive magnetic bodies as the magnetic bodies of the same material exhibiting the same type of a magneto-caloric effect. In the case of using negative magnetic bodies as the magnetic bodies of the same material exhibiting the same type of a magneto-caloric effect, heat is conducted in the direction opposite to the direction shown in FIGS. 4 to 6. Accordingly, in the case negative magnetic bodies were used, the positions of the lower-temperature-side heat-exchanging part 400A and the higher-temperature-side heat-exchanging part 400B would be opposite to what is shown in FIGS. 1 and 4 to 6.

Next, the magnetic cooling/heating apparatus according to the embodiments of the present invention will be separately described as [Embodiment 1] and [Embodiment 2]. The magnetic cooling/heating apparatus according to [Embodiment 1] forms a magnetically-permeable heat-insulating part that is positioned between the heat transfer devices of the heat transfer unit, and that reduces the driving force for the magnetic unit. The magnetic cooling/heating apparatus according to [Embodiment 2] includes a plurality of heat transfer units which are shifted a little from one another in the rotational direction in order to reduce the driving force for the magnetic unit.

[Embodiment 1]

Next, the configuration of the magnetic cooling/heating apparatus according to Embodiment 1 will be described with reference to FIGS. 8 to 12. The operational principle of the magnetic cooling/heating apparatus according to Embodiment 1 described below is the same as the above-described heat-transfer principle. FIG. 8 illustrates the configuration of the heat transfer unit of the magnetic cooling/heating apparatus according to Embodiment 1. FIG. 9 illustrates the configuration of the upside magnetic unit sandwiching the heat transfer unit of FIG. 8. FIG. 10 illustrates the configuration of the downside magnetic unit sandwiching the heat transfer unit of FIG. 8. FIG. 11 is the sectional view of the magnetic cooling/heating apparatus according to Embodiment 1. FIG. 12 is the sectional view of the heat transfer unit and both of the magnetic units of the magnetic coaling/heating apparatus of FIG. 11.

(Configuration of Magnetic Cooling/Heating Apparatus)
<Configuration of Heat Transfer Unit>

As shown in FIG. 8, the heat transfer unit 1000A of the magnetic cooling/heating apparatus is formed into a hollow circular shape. In the hollow space of the heat transfer unit 1000A, the cylindrical higher-temperature-side heat-exchanging part 40B is arranged, and the lower-temperature-side heat-exchanging part 40A is arranged so as to surround the higher-temperature-side heat-exchanging part 40B. A heat transfer device arrangement plate 150 with a thickness of approximately 1 mm is inset between the lower-temperature-side heat-exchanging part 40A and the higher-temperature-side heat-exchanging part 40B (refer to FIG. 12), and fixed by the lower-temperature-side heat exchanging part 40A and the higher-temperature-side heat-exchanging part 40B. In the higher-temperature-side heat-exchanging part 40B, a rotor 310 is installed rotatably via a bearing 45.

In the fan-shaped space with a center angle of 30 degrees on the heat transfer device arrangement plate 150, as shown in FIG. 8 and FIG. 12, the magnetic bodies 10A to 10F with the magneto-caloric effect and the heat-conductive parts 30A to 30G that transfer heat of these magnetic bodies are alternately arranged. The alternately arranged magnetic bodies 10A to 10F and heat-conductive parts 30A to 30G constitute one heat transfer device 50-1. In the fan-shaped space with a center angle of 30 degrees, which adjoins the heat transfer device 50-1, as shown in FIG. 8, the magnetic bodies 11A to 11F with the magneto-caloric effect and the heat-conductive parts 31A to 31G transferring heat of these magnetic bodies are alternately arranged. The alternately arranged magnetic bodies 11A to 11F and heat-conductive parts 31A to 31G constitute one heat transfer device 50-2. The heat transfer devices 50-1, 50-2, . . . are arranged annularly in parallel at intervals on the heat transfer device arrangement plate 150. The heat transfer devices 50-1, 50-2, . . . arranged annularly at intervals on the heat transfer device arrangement plate 150 constitute the heat transfer unit 1000.

As shown in FIG. 8 and FIG. 12, the total of the twelve heat transfer devices 50-1, 50-2, are arranged in parallel for every center angle of 30 degrees on the heat transfer device arrangement plate 150. Each of the twelve heat transfer devices 50-1, 50-2, . . . is arranged at intervals. Between the heat transfer device 50-1 and the heat transfer device 50-2 adjoining each other, the magnetically-permeable heat-insulating part 60 is disposed. The magnetically-permeable heat-insulating part 60 has the equivalent magnetic permeability to that of the magnetic bodies 10A to 10F and the magnetic bodies 11A to 11F of the respective heat transfer device 50-1 and heat transfer device 50-2. If the heat conduction between the heat transfer device 50-1 and the heat transfer device 50-2 is blocked by the magnetically-permeable heat-insulating part 60, an amount of released heat that does not contribute to cooling or heating can be reduced, and the heat efficiency of the magnetic cooling/heating apparatus can be improved.

The magnetically-permeable heat-insulating part 60 is formed so as to fill the gap between the magnetic bodies 10A to 10F and the magnetic bodies 11A to 11F of the adjoining heat transfer device 50-1 and the heat transfer device 50-2. The magnetically-permeable heat-insulating part 60 is inserted between the magnetic bodies 10A to 10F and the magnetic bodies 11A to 11F of the adjoining heat transfer device 50-1 and the heat transfer device 50-2. Thereby, the gap between the magnetic bodies 10A to 10F and the magnetic bodies 11A to 11F is filled, so the peak of the driving force of the magnetic unit is leveled. The reason for this leveled peak is described later in detail. The magnetically-permeable heat-insulating part 60 is formed by mixing metallic powder with a large magnetic permeability such as iron into a material such as a heat-insulating resin with a heat-insulating property, to the degree that the heat-insulating property thereof is not inhibited. Mixing a plurality of materials to form the magnetically-permeable heat-insulating part 60 enables to bring the heat conductivity and the magnetic permeability close to a target value, and the magnetically-permeable heat-insulating part 60 can be easily created.

Meanwhile, the heat transfer device arrangement plate 150 is formed of a material with a high heat insulating property so as not to deprive the heat that is being transferred by the heat transfer device 50-1, the heat transfer device 50-2, and so on. Also, since magnetic flux applied to the magnetic bodies must not be reduced, the heat transfer device arrangement plate 150 is preferably formed of a material through which magnetic flux easily penetrates. The heat transfer devices 50-1, 50-2, were positioned on the upside of the heat transfer device plate 150, but may be positioned under the downside of the heat transfer device arrangement plate 150. Further, the heat transfer devices 50-1, 50-2, may be positioned to be sandwiched by the upside and downside heat transfer device arrangement plates 150.

The cooling-medium pathways 41 and 42 (refer to FIG. 8 and FIG. 11), through which a cooling medium for heat exchange flows, are formed in the lower-temperature-side heat-exchanging part 40A and the higher-temperature-side heat-exchanging part 40B. The cooling medium flowing through the cooling-medium pathways 41 and 42 may be either liquid or gas. In the present embodiment, air is used as the cooling medium. The air to be cooled is sucked into the cooling-medium pathway 41 of the lower-temperature-side heat-exchanging part 40A in the arrow direction shown in the drawing, and the cooled air is discharged in the arrow direction shown in the drawing. The air drawn to the cooling-medium pathway 42 is warmed, and then is discharged (in the arrow direction of FIG. 11) to the front-side direction from the back-side of FIG. 8.

<Magnetic Body>

According to the present embodiment, the magnetic bodies 10A to 10F, the magnetic bodies 11A to 11F, . . . are formed of the same substance. As the same substance, the positive magnetic body is used. The positive magnetic body is fabricated from the substance that reversibly exhibits the paramagnetic state and the ferromagnetic state, so that the positive magnetic body is either in the paramagnetic state (the state in which magnetic spins are in disorder) when a magnetic field is not applied or in the ferromagnetic state (the state in which magnetic spins are directed in one direction) when a magnetic field is applied.

The substance of the positive magnetic bodies may be a magnetic substance including Gd or Gd-based alloys such as a Gd—Y type, Gd—Dy type, Gd—Er type, Gd—Ho type, La (Fe, Si)13, and La (Fe, Al)13.

Meanwhile, the negative magnetic substance that is not used in the present embodiment may be used as the same substance for the magnetic bodies 10A to 10F, the magnetic bodies 11A to 11F, and so on. As the substance for the negative magnetic bodies, a magnetic substance such as Fe—Rh alloy, Co—Mn—Si—Ge type and Ni—Mn—Sn type may be used.

Generally, the positive magnetic body and the negative magnetic body have the opposite property, in that upon magnetic field application, heat is generated as opposed to absorbed. Thereby, the positive magnetic body and the negative magnetic body differ in terms of magnitude of the temperature change due to the magneto-caloric effects thereof. Therefore, when either one of the positive magnetic body or the negative magnetic body is used as in the present embodiment, the magnitude of the temperature change due to the magneto-caloric effects of all the magnetic bodies becomes the same. Accordingly, a stable heat conducting property can be attained throughout the entire magnetic cooling/heating apparatus, and the heat transfer efficiency is improved. Further, since the magneto-caloric effect of the negative magnetic body is smaller compared to the magneto-caloric effect of the positive magnetic body, the positive magnetic body is preferably used, taking heat transfer efficiency into consideration. Further, since the negative magnetic body is to make use of a rare substance compared to a substance for the positive magnetic body, the positive magnetic body is preferably used, taking the cost into consideration.

Further, the positive or negative magnetic bodies are used for the magnetic bodies 10A to 10F, the magnetic bodies 11A to 11F, . . . , and further, the operational temperatures of these magnetic bodies 10A to 10F, these magnetic bodies 11A to 11F, can be set to the same. However, regardless of this configuration, the magnetic bodies with different operational temperatures may be arranged. For example, the magnetic bodies may be arranged such that the operational temperature of the magnetic bodies becomes gradually smaller from the magnetic body 10F adjoining the higher-temperature-side heat-exchanging part 40B toward the magnetic body 10A adjoining the lower-temperature-side heat-exchanging part 40A. Here, the difference between the magnetic body with a higher operational temperature and the magnetic body with a lower operational temperature depends on whether a temperature range in which the magneto-caloric effect appears is high or low.

Thus, by selecting the optimum operational temperatures in accordance with the positions of the magnetic bodies in the heat transfer device 50-1, the heat transfer device 50-2, larger temperature difference can be obtained between the lower-temperature-side heat-exchanging part 40A and the higher-temperature-side heat-exchanging part 4013, than when the magnetic bodies with a uniform operational temperature are used for the heat transfer device 50-1, the heat transfer device 50-2, and so on. As a result, heat transfer capability and heat transfer efficiency can be improved.

<Heat-Conductive Part>

As shown in FIG. 8 and FIG. 12, the magnetic cooling/heating apparatus according to the present embodiment connects the heat-conductive part 30A between the lower-temperature-side heat-exchanging part 40A and the magnetic body 10A in the heat transfer device 50-1. The heat-conductive parts 30B to 30F are connected between the respective magnetic bodies of the magnetic bodies 10A to 10F. The heat-conductive part 30G is connected between the magnetic body 10F and the higher-temperature-side heat-exchanging part 40B. In the heat transfer device 50-2, the heat-conductive part 31A is connected between the lower-temperature-side heat-exchanging part 40A and the magnetic body 11A. The heat-conductive parts 31B to 31F are connected between the respective magnetic bodies of the magnetic bodies 11A to 11F. The heat-conductive part 31G is connected between the magnetic body 11F and the higher-temperature-side heat-exchanging part 40B. The configurations of the other heat transfer devices are also the same as those of the heat transfer device 50-1 and the heat transfer device 50-2.

The heat-conductive parts 30A to 30G, 31A to 31G, . . . according to the present embodiment are formed of metal/insulator-phase-transition bodies. The heat-conductive parts 30A to 30G, the heat-conductive parts 31A to 31G, . . . , as well as the magnetic bodies 10A to 10F and the magnetic bodies 11A to 11F that are arranged between the heat-conductive parts are attached to one another by joining or adhering. Accordingly, the heat transfer device 50-1, the heat transfer device 50-2, . . . are to be formed integrally.

The metal/insulator-phase-transition body has such a property in which voltage application causes the phase of the metal/insulator-phase-transition body to change from an insulator to a metal, whereby the heat conductivity of the metal/insulator-phase-transition body is increased. Contrarily, shutting a voltage application causes the phase of the metal/insulator-phase-transition body to change to an insulator from a metal, whereby the heat conductivity of the metal/insulator-phase-transition body is decreased. As an insulator exhibiting the phase transition between a metal and an insulator, there is an inorganic oxide Mott insulator or an organic Mott insulator. The inorganic oxide Mott insulator includes at least transition metal element. As the Mott insulator, there are known $LaTiO_3$, $SrRuO_4$ and BEDT-TTF (TCNQ). As a currently known device capable of phase transition between a metal and an insulator, there are a ZnO single-crystal thin-film electrical double-layered FET and a TMTSF/TCNQ multi-layered type FET device. Heat can be transferred by thermoelectrons and lattice crystals. The ZnO single-crystal thin-film electrical double-layered FET and the TMTSF/TCNQ multi-layered type FET device are exploited in terms of their property in which thermoelectrons actively move upon the application of a voltage. According to the present embodiment, a material which has the heat conductivity that largely varies by application or removal of a voltage is used for the metal/insulator-phase-transition body, including the inorganic oxide Mott insulator containing at least transition metal element, the organic Mott insulator, the ZnO single-crystal thin-film electrical double-layered FET, TMTSF/TCNQ multi-layered type FET device and the like.

Applying a direct-current voltage V to both surfaces facing each other of the metal/insulator-phase-transition body causes the heat conductivity of the metal/insulator-phase-transition body to relatively increase, whereby heat is conducted between the magnetic bodies. On the other hand, removing the direct-current voltage V causes the heat conductivity of the metal/insulator-phase-transition body to relatively decrease, whereby the heat conduction between the magnetic bodies is prevented. Thus, the heat-conductive parts 30A to 30G, the heat-conductive parts 31A to 31G, . . . function as a heat switch that controls heat transfer according to application or removal of a voltage.

Since the off-and-on of the heat conduction through the heat-conductive parts 30A to 30G, the heat-conductive parts 31A to 31O, . . . can be controlled by application and removal of a voltage, heat can be transferred without sliding the heat-conductive parts between the magnetic bodies. For this reason, the heat-conductive parts do not need to have durability against sliding, and reliability of the heat-conductive parts is improved. Also, mechanical loss due to friction is eliminated, and loss in driving the heat-conductive parts can be reduced. Further, the heat-conductive parts can conduct heat only in the alignment direction of the heat-conductive parts and the magnetic bodies, and the heat conductivity of the heat-conductive parts can be larger compared to that of the sliding type of heat-conductive parts. Accordingly, heat loss in transferring heat can be reduced. In addition, the heat-conductive parts can use all of the contacting surfaces to make connection between the magnetic bodies in accordance with application or removal of a voltage, whereby the heat transfer capability and the heat transfer efficiency can be improved.

By providing an electrode to each of the heat-conductive parts 30A to 30G, the heat-conductive parts 31A to 31G, a voltage can be easily applied to the metal/insulator-phase-transition body. Also, the responsiveness to heat conductivity change can be improved by using the inorganic oxide Mott insulator containing at least transition metal element, the organic Mott insulator, the ZnO single-crystal thin-film electrical double-layered FET, or TMTSF/TCNQ multi-layered type FET device as the metal/insulator-phase-transition body.

In the present embodiment, the metal/insulator-phase-transition body with the heat conductivity that varies by application and removal of a voltage is exemplified. However, any material may be used as the heat-conductive part as far as it has the property in which applying a voltage causes the heat conductivity to increase, and shutting a voltage causes the heat conductivity to decrease. Also, in the present embodiment, the magnetic bodies 10A to 10F, the magnetic bodies 11A to 11F, and the heat-conductive parts 30A to 30G, the heat-conductive parts 31A to 31G, . . . are formed to a shape as if a fan was cut off with a constant width in the radial direction. However, other shapes such as a sphere, an ellipsoid, a cube, a circular cylinder, and an elliptic cylinder may be employed.

<Configuration of Magnetic Unit>

The magnetic units shown in FIG. 9 and FIG. 10 sandwich the heat transfer unit 1000A shown in FIG. 8 from both sides in the vertical direction with a constant gap therebetween. The configuration of the magnetic body is as follows.

The upside circular magnetic unit 2000A is supported freely rotatable clockwise by positioning the front side of FIG. 9 to face the front side of the heat transfer unit 1000A shown in FIG. 8, and by aligning the center of the upside circular magnetic unit 2000A with the center of the heat transfer unit 1000A. FIG. 9 illustrates a state in which the upside magnetic unit 2000A positioned to face the heat transfer unit 1000A is seen through from the upside toward the heat transfer unit 1000A.

The magnetic-field applying/removing part 1U shown in FIG. 9 faces against the heat transfer device 50-1 shown in FIG. 8 at a certain time. At this time, toward the inner circumference of the magnetic unit 2000A from the outer circumference thereof, the permanent magnet 21A faces the magnetic body 10A, the permanent magnet 21C faces the magnetic body 10C, and the permanent magnet 21E faces the magnetic body 10E.

The magnetic-field applying/removing part 2U shown in FIG. 9 faces against the heat transfer device 50-2 shown in FIG. 8 at the same time as the above-described time. At this time, toward the inner circumference of the magnetic unit 2000A from the outer circumference thereof, the permanent magnet 22B faces the magnetic body 11B, the permanent magnet 22D faces the magnetic body 11D, and the permanent magnet 22F faces the magnetic body 11F.

Since the other magnetic-field applying/removing parts in the magnetic unit 2000A are arranged point-symmetrically with respect to the center of the magnetic unit 2000A, the arrangement of the other magnetic-field applying/removing parts is the same as that of the magnetic-field applying/removing part 1U or the magnetic-field applying/removing part 2U.

The downside circular magnetic unit 2000B is supported freely rotatable clockwise by positioning the front side of FIG. 10 to face the back side of the heat transfer unit 1000A shown in FIG. 8, and by aligning the center of the lower-side magnetic unit 2000B to the center of the heat transfer unit 1000A. FIG. 10 illustrates a state in which the downside magnetic unit 2000B positioned to face the heat transfer unit 1000A is seen from the heat transfer unit 1000A.

The magnetic-field applying/removing part 10 shown in FIG. 10 faces against the heat transfer device 50-1 shown in FIG. 8 at the same time as the above-described time. At this time, toward the inner circumference of the magnetic unit 2000A from the outer circumference thereof, the permanent magnet 26A faces the magnetic body 10A, the permanent magnet 26C faces the magnetic body 10C, and the permanent magnet 26E faces the magnetic body 10E.

The magnetic-field applying/removing part 2D shown in FIG. 10 faces against the heat transfer device 50-2 shown in FIG. 8 at the same time as the above-described time. At this time, toward the inner circumference of the magnetic unit 2000A from the outer circumference thereof, the permanent magnet 27B faces the magnetic body 11B, the permanent magnet 27D faces the magnetic body 11D, and the permanent magnet 27F faces the magnetic body 11F.

Since the other magnetic-field applying/removing parts in the magnetic unit 2000B are arranged point-symmetrically with respect to the center of the magnetic unit 2000B, the arrangement of the other magnetic-field applying/removing parts is the same as that of the magnetic-field applying/removing part 1D or the magnetic-field applying/removing part 2D.

The magnetic-field applying/removing parts 1U, 2U, . . . of the upside magnetic unit 2000A respectively face the magnetic-field applying/removing parts 1D, 2D, . . . of the downside magnetic unit 2000B in the vertical direction via the respective heat transfer device 50-1, 50-2, . . . of the heat transfer unit 1000. The upside magnetic unit 2000A and the downside magnetic unit 20005 rotate in synchronization without changing the relative positions thereof, in a state where the magnetic-field applying/removing part 1U faces against the magnetic-field applying/removing part 1D.

The magnetic units 2000A and 2000B are formed in a hollow circular shape. In the inner circumferential space thereof, a fan 210 is provided for introducing air into the cooling medium pathway 42 (FIG. 8 and FIG. 12) formed inside the higher-temperature-side heat-exchanging part 40S. The cooling medium pathway 42 is a pathway that communicates in the layer direction of the heat transfer unit 1000A and the magnetic units 2000A and 2000B. The inner circumferential surface of the fan 210 is fixed to a rotor (rotational shaft) 310 of an outer-rotor motor 350 (refer to FIG. 11). Accordingly, the rotation of the rotor 310 causes the rotation of the magnetic units 2000A and 2000B, whereby the fan 201 causes air to flow from the downside to the upside in the cooling medium pathway 42. A blade 212 of the fan 210 is curved in an optimum angle with respect to the horizontal direction so that an air flow is generated by the rotation of the magnetic units 2000A and 2000B. Using the outer-rotor motor 350 enables the downsizing of the magnetic cooling/heating apparatus.

In the outer circumferential space of the magnetic units 2000A and 2000B, a fan 215 is provided for circulating air in the cooling medium pathway 41 formed in the lower-temperature-side heat-exchanging part 40A. The cooling medium pathway 41 is a pathway that communicates the cooling medium pathways in series individually formed at the outer circumferential space of the heat transfer unit 1000A and the magnetic unit 2000A, and that allows the cooling medium to flow through these cooling medium pathways in the layer direction. The fan 215 is provided with many blades 214. Accordingly, the rotation of the rotor 310 causes the rotation of the magnetic units 2000A and 2000B, whereby the blades 214 can cause the air in the cooling medium pathway 41 to flow along the outer circumference of the heat transfer unit 1000A. The blades 214 are curved by a right angle relative to the horizontal direction so as to efficiently move the air in the cooling medium pathway 41 by the rotation of the magnetic units 2000A and 2000B. In this way, the fans 210 and 215 provided in the inner circumferential space and the outer circumferential space of the magnetic units 2000A and 2000B enable the magnetic units 2000A and 2000B not only to have a function of simply applying and removing a magnetic field but also to function as a fan for allowing the cooling medium to flow. Further, the cooling medium pathways 41 and 42 enable efficient flow of the cooling medium.

According to the present embodiment, as shown in FIG. 12, a reference-position detecting sensor 250 is provided for detecting a reference position of the magnetic unit 2000A. Also, a rotational-position detecting sensor for detecting a rotational position of the outer-rotor motor 350 shown in FIG. 11 is incorporated in the outer-rotor motor 350.

As shown in FIG. 9, FIG. 10 and FIG. 12, on both surfaces of the magnetic units 2000A and 2000B, the magnets are arranged annularly and radially. The magnets in the magnetic unit 2000A are arranged with polarity into consideration such that the north pole and the south pole face against each other as shown in FIG. 12.

The heat transfer units 1000A, 1000B, . . . and the magnetic units 2000A, 2000B, as shown in FIG. 7, are alternately layered plurally at constant intervals. Layering a plurality of the heat transfer units 1000A, 10008, . . . and the magnetic units 2000A, 2000B enables the heat capacity of the magnetic cooling/heating apparatus to become large, and efficient heat conduction with a smaller space becomes possible. The heat transfer unit 1000A, as shown in FIG. 8, is fixed to the rotor 310 via the bearing 45. Accordingly, all the layered heat transfer units 1000A, 1000B, . . . do not rotate and remain stationary even when the rotor 310 rotates. Meanwhile, the magnetic units 2000A, 2000B, . . . are, as shown in FIGS. 8 to 12, attached to the rotor 310. Accordingly, all the layered magnetic units 2000A, 2000B, rotate together with the rotor 310.

In the present embodiment, the configuration of rotating the magnetic units 2000A, 2000B, . . . by the outer-rotor motor 350 was described. However, the magnetic units 2000A, 2000B, . . . may be fixed, and the heat transfer units 1000A, 1000B, . . . may be made to rotate. Both of the magnetic units 2000A, 2000B, . . . and the heat transfer units 1000A, 1000B, . . . may be made to rotate relative to each other. Further, the heat transfer devices 50-1, 50-2, . . . may be linearly arranged in parallel on the outer circumferential surface of a cylinder instead of being arranged annularly as in the present embodiment. In this case, the magnetic unit 2000A would be configured such that the magnets are arranged concentric with the heat transfer devices 50-1, 50-2, . . . on the inner circumferential surface of the cylinder which is positioned outside the heat transfer devices 50-1, 50-2, and so on. Alternatively, the magnets arranged in the magnetic units 2000A, 2000B, . . . preferably are permanent magnets, but may be electromagnets. If the electromagnets were used, the configuration of each of the magnetic units 2000A, 2000B, . . . would be complicated. This is because the electrical wiring needs to be arranged so as to enable electric power to be supplied to the electromagnets in the rotating state. For this reason, according to the present embodiment, the permanent magnets are used.

The rotation of the magnetic units 2000A, 2000B, . . . causes the application or removal of a magnetic field alternately to/from the magnetic bodies of each of the heat transfer devices 50-1, 50-2, . . . of the heat transfer units 1000A, 1000B, . . . at every 30 degrees rotation. At this time, the magnets of the magnetic units 2000A, 2000B, . . . are shifted from the magnetic bodies of one of the heat transfer devices 50-1, 50-2, . . . adjoining in the rotational direction to the magnetic bodies of another heat transfer device 50. However, according to the present embodiment, since the magnetically-permeable heat-insulating part 60 exists between the magnetic bodies, the fluctuation in the driving force of the magnetic units 2000A, 2000B, . . . can be minimal. The fluctuation in the driving force will be described with reference to FIG. 13.

FIG. 13 illustrates an effect of the magnetically-permeable heat-insulating part 60 provided in the heat transfer unit 1000A. As shown in the figure, the magnets move in the illustrated moving direction; and when the magnets are positioned to sandwich the magnetic body in the vertical direction, the lines of the magnetic force of the magnets penetrate the magnetic body to cause the magnetic body to generate heat. At this time, the reaction force in the direction opposite to the moving direction as illustrated acts on the magnetic units 2000A and 2000B. As the magnets continue moving, when the front part of the magnets approaches the gap (the position "a" in the drawing) between the magnetic bodies, the reaction force gradually increases. If the magnetically-permeable heat-insulating part 60 provided in the present embodiment does not exist, as illustrated, the reaction force increases up to the $F_{Amax}$. When the rear part of the magnets passes through the gap, the reaction force in the reverse direction is generated (the position "b" in the drawing). The fluctuation in this reaction force causes a required capacity of the outer-rotor motor 350 for driving the magnetic units 2000A and 2000B to increase. This is because the driving force of the outer-rotor motor 350 needs to be equal to or larger than the $F_{Amax}$. Further, the fluctuation in the reaction force is generated every time the magnets pass the position between the heat transfer devices, which results in a noise or vibration.

on the contrary, according to the present embodiment, since the magnetically-permeable heat-insulating part 60 with the same magnetic permeability as that of the magnetic bodies is formed between the heat transfer devices, the fluctuation in the above-described reaction force can be reduced to a considerably small magnitude as shown in the downside of FIG. 13. For this reason, the magnetic units 2000A and 2000B can rotate relatively smoothly. And, if larger than the reaction force generated between the magnets and the magnetic bodies, the driving force for the outer-rotor motor 350 can be improved. Accordingly, the outer-rotor motor 350 does not require to be an unnecessarily large size, and the magnetic cooling/heating apparatus can be downsized. Further, a noise and vibration is extremely reduced, and thus a quiet magnetic cooling/heating apparatus can be achieved.

A magnetic field is applied to or removed from every other magnetic body of each of the heat transfer devices 50-1, 50-2, of the heat transfer units 1000A, 1000B, . . . at every 30 degrees rotation alternately. In other words, in each of the heat transfer devices 50-1, 50-2, . . . , the state where a magnetic field is applied to the magnetic bodies 10A, 10C and 10E and the state where a magnetic field is applied to the magnetic bodies 10B, 10D and 10F alternately occur. For this reason, each time the magnetic unit 2000A rotates by 30 degrees, the magnetic bodies of each of the heat transfer devices 50-1, 50-2, . . . repeatedly generate and absorb heat. The amount of heat that the magnetic body generates per unit time changes in accordance with a rotational speed of the magnetic unit 2000A. In order to generate a larger amount of heat, a rotational speed of the magnetic units 2000A, 2000B, . . . is increased. When a large amount of heat is not necessary, a rotational speed of the magnetic units 2000A, 2000B, . . . is slowed.

In order to conduct the heat generated or absorbed by the magnetic bodies of each of the heat transfer devices 50-1, 50-2, . . . from the lower-temperature-side heat-exchanging part 40A to the higher-temperature-side heat-exchanging part 40B, the application or removal of a voltage needs to be performed onto each heat-conductive part at the optimum timing. The timing of performing application or removal of a voltage onto all the heat-conductive parts is controlled by a controlling system shown in FIG. 14 onwards.

FIG. 14 is a block diagram showing the controlling system of the magnetic cooling/heating apparatus according to the present embodiment. FIG. 15 is a block diagram of a more detailed controlling system for an air-conditioning control part and an air-conditioning-information input part in FIG. 14.

As shown in FIG. 14, the controlling system of the magnetic cooling/heating apparatus according to the present embodiment comprises the reference-position detecting sensor 250, the air-conditioning-information input part 460, the outer-rotor motor 350, the motor controlling part 380, the heat-conductive parts 30A to 30G, the voltage-application control part 38, and the air-condition control part 450. The outer-rotor motor 350 comprises the rotational-position detecting sensor 370 that detects its own rotational position.

The reference-position detecting sensor 250 detects the reference position set in the magnetic unit 2000A (refer to FIG. 11 and FIG. 12). The reference position is set at the outer circumference of the magnetic unit 2000A. For example, if a reflective body that reflects light is attached at the outer circumference of the magnetic unit 2000A, then the attached position of the reflective body is the reference position. In this case, light-receiving-and-emitting device is used as the reference-position detecting sensor 250, so that the reference position can be detected when the reflective body reflects light from the light-receiving-and-emitting device.

The air-conditioning-information input part 460 inputs information necessary for air conditioning. The information necessary for the air conditioning includes a temperature setting, an inlet temperature of the lower-temperature-side heat-exchanging part, an outlet temperature of the lower-temperature-side heat-exchanging part, an inlet temperature of the higher-temperature-side heat-exchanging part, and an outlet temperature of the higher-temperature-side heat-exchanging part. The air-conditioning-information input part 460 will be described in detail with reference to FIG. 15 later.

The outer-rotor motor 350 is a motor that drives the magnets for selectively applying or removing the magnetic field to/from each magnetic body of the heat transfer devices 50-1, 50-2, and so on. Specifically, the outer-rotor motor 350 simultaneously rotates all the magnetic units 2000A, . . . in which the magnets are arranged as shown in FIG. 12. The outer-rotor motor 350 is provided with the rotational-position detecting sensor 370 that detects its own rotational position. A rotational position detected by the rotational-position detecting sensor 370 is used for controlling the rotational speed of the magnetic units 2000A, and so on.

The motor controlling part 380 uses a rotational position detected by the rotational-position detecting sensor 370 and the reference position detected by the reference-position detecting sensor 250 to control the rotation of the outer-rotor motor 350.

As described above, the heat-conductive parts 30A to 30G increase their heat conductivity when a voltage is applied and decrease it when a voltage is removed. The heat-conductive parts 30A to 30G intermittently conduct heat between the magnetic bodies.

The voltage-application control part 38 selectively applies or removes a voltage to/from each of the heat-conductive parts 30A to 30G, depending on a rotational position of the outer-rotor motor 350. A rotational position of the outer-rotor motor 350 can be determined based on a rotational position detected by the rotational-position detecting sensor 370 and the reference position detected by the reference-position detecting sensor 250. In other words, the position of each magnet can be recognized relative to the magnetic bodies of each of the heat transfer devices 50-1, 50-2, and so on. The voltage-application control part 38 selectively applies or removes a voltage to/from each of the heat-conductive parts 30A to 30G when each magnet comes to the optimum position relative to the magnetic bodies of each of the heat transfer devices 50-1, 50-2, and so on. Thus, by applying or removing a voltage to/from each heat conductive part in synchronization with the timing in which the magnets selectively apply or remove a magnetic field to/from each magnetic body, the voltage-application control part 38 can conduct heat from the lower-temperature-side heat-exchanging part 40A to the higher-temperature-side heat-exchanging part 40B.

The voltage-application control part 38 applies and removes a voltage to/from each of the heat-conductive parts 30A to 30G using the timing of applying and removing a voltage, which is predetermined for each operational condition. The timing of applying and removing a voltage, which is predetermined for each operational condition, is rewritten to an optimum timing in accordance with the operation of the magnetic cooling/heating apparatus. The operational condition is at least one of a required heat amount of the heat transfer devices 50-1, 50-2, . . . temperature difference between the lower-temperature-side heat-exchanging part 40A and the higher-temperature-side heat-exchanging part 40B, or a driving pattern of the magnets.

The air-condition control part 450 comprehensively controls the operation of the magnetic cooling/heating apparatus according to the present embodiment. The air-condition control part 450 will be described in detail with reference to FIG. 15 below.

As shown in FIG. 15, the air-conditioning-information input part 460 comprises a temperature setting part 462, a lower-temperature-side heat-exchanging part inlet temperature sensor 464, a lower-temperature-side heat-exchanging part outlet temperature sensor 466, a higher-temperature-side heat-exchanging part inlet temperature sensor 468, and a higher-temperature-side heat-exchanging part outlet temperature sensor 470.

The temperature setting part 462 is a controller for setting a temperature in a vehicle interior in which the magnetic cooling/heating apparatus performs air conditioning. The lower-temperature-side heat-exchanging part inlet temperature sensors 464 detect temperatures of the cooling media supplied to the lower-temperature-side heat-exchanging parts 40A of the heat transfer unit 1000A, 1000B, . . . shown in FIG. 8. The lower-temperature-side heat-exchanging part inlet temperature sensors 464 are provided at cooling medium inlet portions of the lower-temperature-side heat-exchanging part 40A.

The lower-temperature-side heat-exchanging part outlet temperature sensors 466 detect temperatures of cooling media discharged from the lower-temperature-side heat-exchanging parts 40A of the heat transfer units 1000A, 1000B, . . . shown in FIG. 8. The lower-temperature-side heat-exchanging part outlet temperature sensors 466 are provided at cooling medium outlet portions of the lower-temperature-side heat-exchanging parts 40A. The higher-temperature-side heat-exchanging part inlet temperature sensors 468 detect temperatures of cooling media supplied to the higher-temperature-side heat-exchanging parts 40B shown in FIG. 11 and FIG. 12. The higher-temperature-side heat-exchanging part inlet temperature sensors 468 are provided at cooling medium inlet portions of the higher-temperature-side heat-exchanging parts 40B. The higher-temperature-side heat-exchanging part outlet temperature sensors 470 detect temperatures of cooling media discharged from the higher-temperature-side heat-exchanging parts 40B. The higher-temperature-side heat-exchanging part outlet temperature sensors 470 are provided at cooling medium outlet portions of the higher-temperature-side heat-exchanging parts 40B.

The reason to provide the temperature setting part 462, the lower-temperature-side heat-exchanging part inlet temperature sensors 464, the lower-temperature-side heat-exchanging part outlet temperature sensors 466, the higher-temperature-side heat-exchanging part inlet temperature sensors 468, and the higher-temperature-side heat-exchanging part outlet temperature sensors 470 is to recognize how much heat needs to be transferred from the lower-temperature-side heat-exchanging part 40A to the higher-temperature-side heat-exchanging part 403 at the heat transfer units 1000A, 1000B, and so on. If the heat amount needed to be transferred is recognized, it is possible to adjust a rotational speed of the outer-rotor motor 350 and a timing of turning on or off the voltage application to the heat-conductive parts 30A to 30G, 31A to 31G, and so on.

The air-conditioning control part 450 comprises a switching control part 452 and a switching-pattern storing part 454. The switching control part 452 controls the switching of voltage application to each heat-conductive part 30A to 30G, 31A to 31G, . . . using a temperature setting, a lower-temperature-side heat-exchanging part inlet temperature, a lower-temperature-side heat-exchanging part outlet temperature, a higher-temperature-side heat-exchanging part inlet temperature, and a higher-temperature-side heat-exchanging part outlet temperature. The switching-pattern storing part 454 stores switching patterns of turning on and off voltage application to each of the heat-conductive part 30A to 30G, 31A to 31G, and so on.

Next, the operation of the magnetic cooling/heating apparatus according to the present embodiment will be briefly described with reference to a flowchart of FIG. 16. FIG. 16 is the operational flowchart of the magnetic cooling/heating apparatus according to the present embodiment.

(Operation of Magnetic Cooling/Heating Apparatus)

First, an operator inputs a temperature setting for a vehicle interior from the temperature setting part 462. When the temperature setting is input, the air-condition control part 450 inputs a required heat amount and required temperature difference (S1). The air-condition control part 450 determines the required heat amount necessary to bring the vehicle interior temperature to the set temperature by referring to a space capacity of the vehicle interior, a current temperature in the vehicle interior, and the temperature setting in the vehicle interior. Also, the air-condition control part 450 determines the temperature difference between the lower-temperature-side heat-exchanging part 40A and the higher-temperature-side heat-exchanging part 40B. The determined value is input as the required heat amount and the required temperature difference.

Next, the air-condition control part 450 checks the input required heat amount and the required temperature difference against a map stored in advance to determine magnetic-field-applying frequency f, and obtains a switching pattern of turning on and off the heat-conductive parts 30A to 30G, 31A to 31G, ... from the switching-pattern storing part 454 (S2). TSs of the switching pattern is a timing of turning on the heat-conductive parts 30A to 30G, 31A to 31G, ..., that is, a timing of applying a voltage to the heat-conductive parts 30A to 30G, 31A to 31G, and so on. On the other hand, TSe of the switching pattern is a timing of turning off the heat-conductive parts 30A to 300, 31A to 31G, ..., that is, a timing of removing a voltage from the heat-conductive parts 30A to 30G, 31A to 31G, and so on.

The air-condition control part 450 operates the magnetic cooling/heating apparatus (S3). In other words, the air-condition control part 450 outputs an instruction of the rotational frequency to the motor controlling part 380 to actualize the determined magnetic-field-applying frequency f. The magnetic-field-applying frequency indicates how many times a magnetic field is applied to one magnetic body per second. For example, when the magnetic-field-applying frequency f was determined to be 6 Hz, in the case of the magnetic cooling/heating apparatus with the configuration shown in FIG. 8 to FIG. 12, the required rotational frequency of the magnetic units 2000A, 2000B, ... is 60 rpm, because the application and removal of a magnetic field is performed 6 times while the magnetic units 2000A, 2000B, ... complete a rotation per second. The rotational frequency of the outer-rotor motor 350 necessary for the magnetic units 2000A, 2000B, to rotate at the speed of 60 rpm is instructed to the motor controlling part 380. Further, the air-condition control part 450 sends the switching pattern to the voltage-application control part 38 to reproduce the switching pattern obtained from the switching-pattern storing part 454.

The air-condition control part 450 determines whether the operation of the step S3 is performed a predetermined number of cycles or not (S4). As shown in FIG. 7, just after the operation of the magnetic cooling/heating apparatus is started, the temperature difference between the lower-temperature-side heat-exchanging part 40A and the higher-temperature-side heat-exchanging part 40B gradually increases. Until this temperature difference reaches the required temperature difference, the application and removal of a magnetic field needs to be repeated the predetermined number of cycles. In the case of the magnetic cooling/heating apparatus according to the present embodiment, one complete rotation of the magnetic units 2000A, 2000B, ... causes the application and removal of a magnetic field to be repeated 6 times. Accordingly, for example, if the predetermined number of cycles is set to 1200 cycles, it is determined whether the magnetic units 2000A, 2000B, ... rotate 200 times or not.

If the operation of the step S3 is not reached the predetermined number of cycles (S4: NO), the air-conditioning control part 450 repeats the process of the step S3. On the other hand, if the operation of the step S3 is performed the predetermined number of cycles (S4: YES) the process proceeds to the next step.

Next, the air-condition control part 450 calculates an output heat amount and an output temperature difference (S5). To obtain the output heat amount, the temperature difference between the lower-temperature-side heat-exchanging part inlet temperature Tci of the cooling medium detected by the lower-temperature-side heat-exchanging part inlet temperature detecting sensor 464 and the lower-temperature-side heat-exchanging part outlet temperature Tco of the cooling medium detected by the lower-temperature-side heat-exchanging part outlet temperature detecting sensor 466 is determined; and, this temperature difference is multiplied by the mass mc and the specific heat Cp of the cooling medium. Further, the output temperature difference is a temperature difference between the higher-temperature-side heat-exchanging part outlet temperature Tho of the cooling medium detected by the higher-temperature-side heat-exchanging part inlet temperature detecting sensor 468 and the lower-temperature-side heat-exchanging part outlet temperature Tco of the cooling medium detected by the lower-temperature-side heat-exchanging part outlet temperature detecting sensor 466.

Next, the air-condition control part 450 calculates a difference between the required heat amount input at Step S1 and the output heat amount obtained at Step S5. Further, the air-condition control part 450 calculates a difference between the required temperature difference input at Step Si and the output temperature difference obtained at Step S5 (S6).

The air-condition control unit 450 determines whether or not the difference between the required heat amount and the output heat amount as well as the difference between the required temperature difference and the output temperature difference are within a predetermined range (S7).

If the difference between the required heat amount and the output heat amount as well as the difference between the required temperature difference and the output temperature difference are within the predetermined range (S7: YES), the air-conditioning control unit 450 updates the magnetic-field-applying frequency f obtained at Step S2 and the switching pattern of turning on and off the heat-conductive parts 30A to 30G, 31A to 31G, ... and causes the switching pattern storing part 454 to store them. Using the magnetic-field-applying frequency f obtained at Step S2 and the switching pattern for turning on and off the heat-conductive parts 30A to 30G, 31A to 31G, ..., the operation of the magnetic cooling/heating apparatus is continued (S8).

If the difference between the required heat amount and the output heat amount as well as the difference between the required temperature difference and the output temperature difference are not within the predetermined range (S7: NO), the air-condition control unit 450 changes the magnetic-field-applying frequency f obtained at Step S2 to f+Δf, and set the TSs and TSe of the switching pattern of turning on and off the heat-conductive parts 30A to 30G to TSs+ΔTSs and TSe+ΔTSe, respectively (S9). Then, the processes from Step S3 to Step S7 are repeated. In this way, learning the optimum magnetic-field-applying frequency f and the optimum switching pattern enables to correct the variation in the heat generation property which differs for every magnetic body and the variation in the heat conductivity which differs for every heat-conductive part.

As described above, in the magnetic cooling/heating apparatus according to the present embodiment, it becomes possible to transfer heat from the lower-temperature-side heat-exchanging part 40A toward the higher-temperature-side heat-exchanging part 40B, only by rotating the magnetic units 2000A, 2000B, . . . with the arranged magnets and by applying a voltage to the heat-conductive parts 30A to 30G, 31A to 31G, and so on. Further, the air can flow through the cooling medium pathway 42 of the higher-temperature-side heat-exchanging part 40B in the layer direction of the magnetic units 2000A, 2000B, . . . by the fan 210 formed at the inner circumferential space of the magnetic units 2000A, 2000B, . . . , whereby a warm air is generated. Also, the air can flow through the cooling medium pathway 41 of the lower-temperature-side heat-exchanging part 40A in the rotational direction of the magnetic units 2000A, 2000B, . . . by the fan 215 formed at the outer circumferential space of the magnetic units 2000A, 2000B, . . . , whereby a cool air is generated.

[Embodiment 2]

The configuration of the magnetic cooling/heating apparatus according to Embodiment 2 will be described with reference to FIG. 17 and FIG. 18. In the configuration shown in FIG. 11 and FIG. 12, the heat transfer unit 1000A, 1000B, 1000C and 1000D are respectively shifted a little in the rotational direction (with a phase difference). The operation of the magnetic cooling/heating apparatus according to Embodiment 2 is the same as the magnetic cooling/heating apparatus according to Embodiment 1.

FIG. 17 shows the configuration of the heat transfer units of the magnetic cooling/heating apparatus according to Embodiment 2. FIG. 18 illustrates an effect in the case where heat transfer units are arranged with phase difference from one another.

The heat transfer units 1000A to 1000D shown in FIG. 17 are not provided with the magnetically-permeable heat-insulating part 60, thus are different from the heat transfer units 1000A, 1000B, . . . of Embodiment 1. For this reason, the reaction force $F_{Amax}$ illustrated in FIG. 13 is generated in the heat transfer units 1000A to 1000D. If the heat transfer units 1000A to 1000D are simply layered, the total reaction force generated in all the heat transfer units 100 will be increased. In the present embodiment, this total reaction force is made small.

As shown in FIG. 11 and FIG. 12, the heat transfer units 1000A to 1000D, . . . and the magnetic units 2000A, 2000B, . . . are alternately arranged on the top of another. According to the present embodiment, in layering the heat transfer units 1000A to 1000D, . . . , these are shifted by 7.5 degrees from one another in the rotational direction, in the order from the upside in the layered direction as shown in FIG. 17.

As shown in FIG. 17, the heat transfer unit 1000A disposed first is arranged without a phase shift in the rotational direction. Under the heat transfer unit 1000A, the heat transfer unit 1000B is arranged with a phase shifted by 7.5 degrees in the rotational direction. Likewise, the heat transfer units 1000C, 1000D, . . . arranged under the heat transfer unit 1000B are arranged with the phase shifted by 7.5 degrees in the rotational direction relative to the heat transfer unit right above. Such arrangement of the heat transfer units 1000A to 1000D, . . . enables a plurality of the heat transfer units 1000A to 1000D, . . . to be arranged such that gaps (refer to FIG. 8) between the heat transfer device 50-1 and the heat transfer device 50-2 do not overlap in the layer direction.

The rotation of the magnetic unit 2000A, 2000B, . . . causes, at every 30 degrees rotation, the application or removal of a magnetic field to be performed alternately to/from the magnetic bodies 10A-10F, 11A to 11F, . . . of each of the heat transfer devices 50-1, 50-2, . . . of the heat transfer units 1000A, 1000B, 1000C, 1000D and so on. At this time, the positions of the magnets of the magnetic units 2000A, 2000B, . . . are shifted from the magnetic bodies of one of the heat transfer devices adjoining in the rotational direction to the magnetic bodies of the another heat transfer device. However, according to the present embodiment, the heat transfer units 1000A to 1000D are arranged with the phase shifted from one another. Thereby, the fluctuation in the driving force for the respective heat transfer units 1000A to 1000D is dispersed. The fluctuation in the driving force will be described with reference to FIG. 18.

As shown in FIG. 18, when the magnets are positioned to overlap the magnetic body after moving in the illustrated moving direction, the lines of the magnetic force of the magnets penetrate the magnetic body, which causes the magnetic body to generate heat. At this time, the reaction force as illustrated acts on the magnetic units 2000A, 2000B in the direction opposite to the moving direction of the magnets. As the magnets continue to move, when the front portions of the magnets approach the gap (position "a" in the drawing) existing between the magnetic bodies, the reaction force gradually increases. The reaction force increases up to $F_{Amax}$ (with the magnitude four times larger compared to the single layer) due to four heat transfer units 1000A to 1000D. Subsequently, when the rear portions of the magnets pass the gap, the reaction force with the same magnitude is generated in the opposite direction. This fluctuation in the reaction force increases a required capacity of the outer-rotor motor 350 driving the magnetic units 2000A and 2000B. This is because the driving force of the outer-rotor motor 350 needs to be equal or more than the value $F_{Amax}$. Further, since the fluctuation in the reaction force is generated each time the magnets pass the position between the heat transfer devices 50-1 and 50-2, this could be source of noise or vibration.

As in the present embodiment, the respective heat transfer units 1000A to 1000D are arranged in the layer direction with the phases shifted from one another. Thereby, as shown in the lower part of FIG. 18, although there are still the same reaction forces as in the single layer, the respective reaction force is dispersed. For this reason, the magnetic units 2000A, 2000B rotate relatively smoothly compared to the case with no phase difference. And, the driving force of the outer-rotor motor 350 is improved if it is larger than reaction force generated in the single layer. Accordingly, the outer-rotor motor 350 does not need to be unnecessarily large, and the downsizing of the outer-rotor motor 350 becomes possible. Further, a noise and vibration is extremely reduced, and thus a quiet magnetic cooling/heating apparatus can be achieved.

According to the present embodiment, the phase difference was incorporated in the arrangement of the heat transfer units 1000A to 1000D. However, phase difference may be incorporated in the arrangement of the magnetic units 2000A to 2000D. Alternatively, a phase difference may be incorporated both in the arrangement of the heat transfer units 1000A to 1000D and in the arrangement of the magnetic units 2000A to 2000D.

As described above, according to the magnetic cooling/heating apparatus of the present invention, the fluctuation in the driving force for the magnetic units 2000A, . . . can be made small. Thereby, the motor for driving the magnetic cooling/heating apparatus can be downsized. Accordingly, electric power consumed by the motor can be decreased. As a result, energy efficiency of the magnetic cooling/heating apparatus can be increased, and the magnetic cooling/heating apparatus can be operated with a small noise and small vibration.

The embodiments described above separately exemplified one form with the magnetically-permeable heat-insulating part 60 between the heat transfer device 50-1 and the heat transfer device 50-2, as well as another form without it. For the one form (Embodiment 1) with the magnetically-permeable heat-insulating part 60, the arrangement was made without phase difference in the layer direction. For the other form (Embodiment 2) without the magnetically-permeable heat-insulating part 60, the arrangement was made with a phase difference in the layer direction. However, alternatively, it is also possible to configure such that the magnetically-permeable heat-insulating part 60 may be provided between the heat transfer device 50-1 and the heat transfer device 50-2, and that the arrangement may be made with a phase difference in the layer direction. In this case, electric power consumed by the motor can be further reduced compared to Embodiment 1 and Embodiment 2.

REFERENCE SIGN LIST

10A-10F, 11A-11F magnetic body,
21A-21F, 22A-22F, 26A-26F, 27A-27F permanent magnet,
30A-30G, 31A-31G heat-conductive part,
40A lower-temperature-side heat-exchanging part,
408 higher-temperature-side heat-exchanging part,
50-1, 50-2 heat transfer device,
60 magnetically-permeable heat-insulating part,
1000A-1000D heat transfer unit,
2000A, 20003 magnetic unit,
210, 215 fan,
250 reference-position detecting sensor,
350 outer-rotor motor (motor),
310 rotor (rotational shaft),
450 air-condition control part.

What is claimed is:

1. A magnetic cooling/heating apparatus comprising:
   a heat transfer unit comprising a plurality of heat transfer devices arranged in parallel at intervals, wherein the heat transfer device comprises magnetic bodies with a magneto-caloric effect and heat-conductive parts that transfer the heat of the magnetic bodies, both of which are alternately arranged;
   a magnetic unit comprising a plurality of magnets that are arranged so as to face against each of the magnetic bodies of the heat transfer unit and to selectively apply and remove the magnetic field to/from each of the magnetic bodies; and
   a motor that moves at least one of the heat transfer unit and the magnetic unit facing each other, relative to each other in the direction in which the heat transfer devices are arranged,
   wherein a magnetically-permeable heat-insulating part that has the equivalent magnetic permeability to that of the magnetic bodies and blocks heat conduction is formed between the heat transfer devices of the heat transfer unit.

2. The magnetic cooling/heating apparatus according to claim 1, wherein a plurality of heat transfer units and a plurality of magnetic units are alternately layered at intervals, and the motor moves at least either a plurality of layered heat transfer units or a plurality of layered magnetic bodies relatively and integrally.

3. The magnetic cooling/heating apparatus according to claim 1, wherein the magnetically-permeable heat-insulating part is formed so as to fill a gap between the magnetic bodies of the heat transfer devices adjoining each other.

4. The magnetic cooling/heating apparatus according to claim 1, wherein the magnetically-permeable heat-insulating part is formed by mixing metallic powder with a large magnetic permeability into a material with a heat-insulating property, to the degree that the heat-insulating property thereof is not inhibited.

5. The magnetic cooling/heating apparatus according to claim 1, wherein the heat transfer unit and the magnetic unit are formed in a hollow circular shape, and at least one of the heat transfer unit and the magnetic unit is supported freely rotatable by the motor, and
   the magnetic cooling/heating apparatus further comprising:
   a lower-temperature-side heat-exchanging part arranged via the heat-conductive parts at one end of the heat transfer devices of the heat transfer unit; and
   a higher-temperature-side heat-exchanging part arranged via the heat-conductive parts at the other end of the heat transfer devices,
   wherein a fan is provided at an inner circumferential space or an outer circumferential space of the heat transfer unit or the magnetic unit which rotates, the fan supplying a cooling medium into a cooling medium pathway of the lower-temperature-side heat-exchanging part or the higher-temperature-side heat-exchanging part.

6. The magnetic cooling/heating apparatus according to claim 5, wherein the higher-temperature-side heat-exchanging part is arranged at an inner circumferential space of the heat transfer unit and the magnetic unit,
   the lower-temperature-side heat-exchanging part is arranged at an outer circumferential space of the heat transfer unit and the magnetic unit,
   the cooling medium pathway of the higher-temperature-side heat-exchanging part has a cylindrical shape so as to communicate in the layer direction of the heat transfer unit and the magnetic unit, and
   the cooling medium pathway of the lower-temperature-side heat-exchanging part has a shape so as to render a plural cooling medium pathways communicate each other, the plural cooling medium pathways being individually formed at the outer circumferential space of the heat transfer unit or at the outer circumferential space of the each of the heat transfer unit and the magnetic unit.

7. The magnetic cooling/heating apparatus according to claim 1, wherein the motor is an outer-rotor motor comprising a rotational shaft integrally rotating the magnetic unit as a rotor.

8. The magnetic cooling/heating apparatus according to claim 1, wherein the magnetic body with the magneto-caloric effect are either a positive magnetic body that generates heat upon the magnetic-field application thereto and absorbs heat upon the magnetic-field removal therefrom, or a negative magnetic body that absorbs heat upon the magnetic-field application thereto and generates heat upon the magnetic-field removal therefrom.

9. A magnetic cooling/heating apparatus comprising:
   heat transfer units comprising a plurality of heat transfer devices arranged in parallel with gaps therebetween, wherein the heat transfer device comprises magnetic bodies with a magneto-caloric effect and heat-conductive parts that transfer the heat of the magnetic bodies, both of which are alternately arranged; and
   magnetic units comprising a plurality of magnets that are arranged so as to face against each of the magnetic bodies of the heat transfer unit and to selectively apply and remove the magnetic field to/from each of the magnetic bodies,
   wherein the heat transfer units and the magnetic units are alternately layered at intervals, at least a part of the heat transfer unit is arranged so as to be shifted from another heat transfer unit in an arrangement direction of the heat transfer devices, or at least a part of the magnetic unit is arranged so as to be shifted from another magnetic unit in the arrangement direction of the heat transfer devices, and a motor moves at least one of layered heat transfer units and the magnetic units integrally and relatively to each other in the arrangement direction of the heat transfer devices.

* * * * *